United States Patent
Schmid et al.

(10) Patent No.: US 9,602,176 B2
(45) Date of Patent: *Mar. 21, 2017

(54) DISTRIBUTED ANTENNA SYSTEM FOR MIMO SIGNALS

(71) Applicant: CommScope Technologies LLC, Hickory, NC (US)

(72) Inventors: Peter Schmid, Marxheim-Neuhausen (DE); Peter Gunzner, Monheim (DE); Harald Langer, Wemding (DE); Stefan Eisenwinter, Buchdorf (DE); Oliver Braz, Monheim (DE); Marianna Fabbri, Faenza (RA) (IT); Enrico Maria Fabbri, Forli (IT); Samuele Brighenti, Faenza (ra) (IT); Marco Parucci, S. Michele (RA) (IT); Massimiliano Mini, Forlí (IT); Thomas Kummetz, Adelsried (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,025

(22) Filed: Jan. 4, 2016

(65) Prior Publication Data

US 2016/0119041 A1 Apr. 28, 2016

Related U.S. Application Data

(63) Continuation of application No. 13/796,978, filed on Mar. 12, 2013, now Pat. No. 9,231,670, which is a
(Continued)

(51) Int. Cl.
*H04B 10/00* (2013.01)
*H04B 7/14* (2006.01)
(Continued)

(52) U.S. Cl.
CPC ......... *H04B 7/0413* (2013.01); *H04B 1/0096* (2013.01)

(58) Field of Classification Search
CPC .................................................. H04B 7/0413
(Continued)

(56) References Cited

U.S. PATENT DOCUMENTS 3,665,316 A 5/1972 Jeffers
3,740,756 A 6/1973 Sosin
(Continued)

FOREIGN PATENT DOCUMENTS

| CN | 1523371 A | 8/2004 |
|---|---|---|
| CN | 1964216 A | 5/2007 |

(Continued)

OTHER PUBLICATIONS

Four-Page Bong Youl Cho, et al., "Practical Scheme to Enable MIMO Communications in Distributed Antenna Systems for Efficient Indoor Coverage" Symposium on Communications and Information Technology, IEEE, Piscataway, NJ, USA, Sep. 28, 2009, pp. 25-28.

(Continued)

*Primary Examiner* — Ken N Vanderpuye
*Assistant Examiner* — Amritbir Sandhu
(74) *Attorney, Agent, or Firm* — Fogg & Powers LLC

(57) ABSTRACT

A distributed antenna system includes a master unit configured to receive at least one set of multiple input multiple output (MIMO) channel signals from at least one signal source. The master unit is configured to frequency convert at least one of the MIMO channel signals to a different frequency from an original frequency, and combine the MIMO channel signals for transmission. An optical link couples the master unit with a unit remote from the master unit for transceiving the MIMO channel signals. Conversion
(Continued)

circuitry is configured to frequency convert at least one of the first and second MIMO channel signals from the different frequency back to an original frequency for transmission over an antenna.

20 Claims, 24 Drawing Sheets

Related U.S. Application Data continuation of application No. PCT/US2011/054281, filed on Sep. 30, 2011.

(60) Provisional application No. 61/388,973, filed on Oct. 1, 2010.

(51) Int. Cl.
*H04B 7/02* (2006.01)
*H04B 7/0413* (2017.01)
*H04B 1/00* (2006.01)

(58) Field of Classification Search
USPC .................................................... 398/115
See application file for complete search history.

(56) References Cited

U.S. PATENT DOCUMENTS

| | | |
|---|---|---|
| 3,778,716 A | 12/1973 | Stokes |
| 3,898,566 A | 8/1975 | Switzer et al. |
| 4,092,596 A | 5/1978 | Dickinson et al. |
| 4,213,132 A | 7/1980 | Davidson |
| 4,238,779 A | 12/1980 | Dickinson et al. |
| 4,615,040 A | 9/1986 | Mojoli et al. |
| 4,709,418 A | 11/1987 | Fox et al. |
| 4,763,317 A | 8/1988 | Lehman et al. |
| 4,827,270 A | 5/1989 | Udagawa et al. |
| 4,849,811 A | 7/1989 | Kleinerman |
| 4,949,340 A | 8/1990 | Smith et al. |
| 5,025,485 A | 6/1991 | Csongor et al. |
| 5,153,763 A | 10/1992 | Pidgeon |
| 5,239,667 A | 8/1993 | Kanai |
| 5,263,175 A | 11/1993 | Dejmek |
| 5,428,817 A | 6/1995 | Yahagi |
| 5,444,697 A | 8/1995 | Leung et al. |
| 5,519,735 A | 5/1996 | Rice et al. |
| 5,627,879 A | 5/1997 | Russell et al. |
| 5,657,374 A | 8/1997 | Russell et al. |
| 5,715,275 A | 2/1998 | Emi |
| 5,719,867 A | 2/1998 | Borazjani |
| 5,745,858 A | 4/1998 | Sato et al. |
| 5,774,789 A | 6/1998 | van der Kaay et al. |
| 5,854,986 A | 12/1998 | Dorren et al. |
| 5,867,292 A | 2/1999 | Crimmins et al. |
| 5,881,095 A | 3/1999 | Cadd |
| 5,930,231 A | 7/1999 | Miller et al. |
| 5,930,293 A | 7/1999 | Light et al. |
| 5,969,837 A | 10/1999 | Farber et al. |
| 6,064,665 A | 5/2000 | Leuck et al. |
| 6,125,109 A | 9/2000 | Fuerter |
| 6,215,777 B1 | 4/2001 | Chen et al. |
| 6,222,503 B1 | 4/2001 | Gietema et al. |
| 6,366,789 B1 | 4/2002 | Hildebrand |
| 6,405,341 B1 | 6/2002 | Maru |
| 6,418,558 B1 | 7/2002 | Roberts et al. |
| 6,486,907 B1 | 11/2002 | Farber et al. |
| 6,590,871 B1 | 7/2003 | Adachi |
| 6,594,496 B2 | 7/2003 | Schwartz |
| 6,704,545 B1 | 3/2004 | Wala |
| 6,715,349 B2 | 4/2004 | Atkinson |
| 6,801,767 B1 | 10/2004 | Schwartz et al. |
| 6,831,901 B2 | 12/2004 | Millar |
| 6,870,515 B2 | 3/2005 | Kitchener et al. |
| 6,906,681 B2 | 6/2005 | Hoppenstein |
| 6,925,578 B2 | 8/2005 | Lam et al. |
| 6,961,388 B2 | 11/2005 | Ling et al. |
| 6,963,552 B2 | 11/2005 | Sabat, Jr. et al. |
| 7,024,231 B2 | 4/2006 | Cohen |
| 7,043,270 B2 | 5/2006 | Judd et al. |
| 7,215,651 B2 | 5/2007 | Millar |
| 7,233,771 B2 | 6/2007 | Proctor, Jr. et al. |
| 7,260,153 B2 | 8/2007 | Nissani (Nissensohn) et al. |
| 7,328,033 B2 | 2/2008 | Rappaport et al. |
| 7,339,897 B2 | 3/2008 | Larsson et al. |
| 7,346,040 B2 | 3/2008 | Weinstein |
| 7,391,815 B2 | 6/2008 | Lakkis |
| 7,395,040 B2 | 7/2008 | Behzad |
| 7,403,576 B2 | 7/2008 | Lakkis |
| 7,430,397 B2 | 9/2008 | Suda et al. |
| 7,440,436 B2 | 10/2008 | Cheng et al. |
| 7,443,708 B2 | 10/2008 | Madan et al. |
| RE40,564 E | 11/2008 | Fischer et al. |
| 7,446,630 B2 | 11/2008 | Chan et al. |
| 7,450,637 B2 | 11/2008 | Lakkis |
| 7,469,015 B2 | 12/2008 | Le Nir et al. |
| 7,483,483 B2 | 1/2009 | Lakkis |
| 7,483,504 B2 | 1/2009 | Shapira et al. |
| 7,555,261 B2 | 6/2009 | O'Neill |
| 7,587,001 B2 | 9/2009 | Hazani et al. |
| 7,603,141 B2 | 10/2009 | Dravida |
| 7,613,423 B2 | 11/2009 | Ngo et al. |
| 7,630,356 B2 | 12/2009 | Zhang et al. |
| 7,650,261 B2 | 1/2010 | Takiishi et al. |
| 7,653,083 B2 | 1/2010 | Liu et al. |
| 7,653,146 B2 | 1/2010 | Kisovec et al. |
| 7,653,148 B2 | 1/2010 | Kisovec et al. |
| 7,656,842 B2 | 2/2010 | Thomas et al. |
| 7,672,739 B2 | 3/2010 | Ganesan et al. |
| 7,710,327 B2 | 5/2010 | Saban et al. |
| 7,720,036 B2 | 5/2010 | Sadri et al. |
| 7,751,775 B2 | 7/2010 | Baier et al. |
| 7,760,699 B1 | 7/2010 | Malik |
| 7,761,050 B2 | 7/2010 | Fitton et al. |
| 7,787,823 B2 | 8/2010 | George et al. |
| 7,809,073 B2 | 10/2010 | Liu |
| 7,813,451 B2 | 10/2010 | Binder et al. |
| 7,817,603 B2 | 10/2010 | Liu |
| 7,822,148 B2 | 10/2010 | Shapira et al. |
| 7,840,190 B2 | 11/2010 | Saban et al. |
| 7,929,596 B2 | 4/2011 | Lakkis |
| 7,965,990 B2 | 6/2011 | Luz et al. |
| 8,010,116 B2 | 8/2011 | Scheinert |
| 8,023,826 B2 | 9/2011 | Fasshauer et al. |
| 8,055,300 B2 | 11/2011 | Andersson et al. |
| 8,111,959 B2 | 2/2012 | Shapiro |
| 8,121,535 B2 | 2/2012 | Proctor, Jr. et al. |
| 8,121,646 B2 | 2/2012 | Oren et al. |
| 8,126,396 B2 | 2/2012 | Bennett |
| 8,131,218 B2 | 3/2012 | Kleider et al. |
| 8,135,273 B2 | 3/2012 | Sabat, Jr. et al. |
| 8,156,535 B2 | 4/2012 | Sage |
| 8,159,954 B2 | 4/2012 | Larsson et al. |
| 8,160,121 B2 | 4/2012 | Forenza et al. |
| 8,170,081 B2 | 5/2012 | Forenza et al. |
| 8,175,459 B2 | 5/2012 | Thelen et al. |
| 8,175,649 B2 | 5/2012 | Saban et al. |
| 8,184,681 B2 | 5/2012 | Binder et al. |
| 8,195,224 B2 | 6/2012 | Saban et al. |
| 8,208,414 B2 | 6/2012 | Singh et al. |
| 8,208,963 B2 | 6/2012 | Codreanu et al. |
| 8,245,092 B2 | 8/2012 | Kotecha et al. |
| 8,248,993 B2 | 8/2012 | Cai |
| 8,289,910 B2 | 10/2012 | Gabriel et al. |
| 8,310,963 B2 | 11/2012 | Singh |
| 8,320,957 B2 | 11/2012 | Saban et al. |
| 8,325,693 B2 | 12/2012 | Hazani et al. |
| 8,325,759 B2 | 12/2012 | Hazani et al. |
| 8,331,425 B2 | 12/2012 | Nicolas et al. |
| 8,346,091 B2 | 1/2013 | Kummetz et al. |
| 8,351,531 B2 | 1/2013 | Yu et al. |
| 8,396,368 B2 | 3/2013 | Tarlazzi et al. |
| 8,412,260 B2 | 4/2013 | Rave |
| 8,472,367 B2 | 6/2013 | Larsson et al. |

(56) References Cited

U.S. PATENT DOCUMENTS

| | | | |
|---|---|---|---|
| 8,503,544 B2 | 8/2013 | Chockalingam et al. |
| 8,509,342 B2 | 8/2013 | Dufresne et al. |
| 8,509,708 B2 | 8/2013 | Zhang et al. |
| 8,514,915 B2 | 8/2013 | Binder et al. |
| 8,514,963 B2 | 8/2013 | Matsumoto et al. |
| 8,515,862 B2 | 8/2013 | Zhang et al. |
| 8,548,330 B2 | 10/2013 | Berlin et al. |
| 8,571,086 B2 | 10/2013 | Forenza et al. |
| 8,594,133 B2 | 11/2013 | Shapira et al. |
| 8,594,223 B2 | 11/2013 | Ranson et al. |
| 8,626,238 B2 | 1/2014 | Stratford et al. |
| 8,644,844 B2 | 2/2014 | Shapira et al. |
| 8,654,815 B1 | 2/2014 | Forenza et al. |
| 8,655,396 B2 | 2/2014 | Malladi et al. |
| 8,681,916 B2 | 3/2014 | Braz et al. |
| 8,681,917 B2 | 3/2014 | McAllister et al. |
| 8,711,760 B2 | 4/2014 | Kasher |
| 8,711,778 B2 | 4/2014 | Murata |
| 8,730,848 B2 | 5/2014 | Schmid et al. |
| 8,744,504 B2 | 6/2014 | Faccin et al. |
| 8,774,079 B2 | 7/2014 | Proctor, Jr. et al. |
| 8,798,209 B2 | 8/2014 | Lee et al. |
| 8,824,588 B2 | 9/2014 | Emmanuel et al. |
| 8,855,036 B2 | 10/2014 | Sabat et al. |
| 8,873,585 B2 | 10/2014 | Oren et al. |
| 8,897,215 B2 | 11/2014 | Shapira et al. |
| 8,913,963 B2 | 12/2014 | Lundstrom et al. |
| 8,958,789 B2 | 2/2015 | Bauman et al. |
| 8,976,887 B2 | 3/2015 | Reingold |
| 9,008,205 B1 | 4/2015 | Al-Dhahir |
| 9,014,237 B2 | 4/2015 | Li et al. |
| 9,014,256 B2 | 4/2015 | Ranson et al. |
| 9,019,929 B2 | 4/2015 | Berlin et al. |
| 9,026,036 B2 | 5/2015 | Saban et al. |
| 9,036,684 B2 | 5/2015 | Hui et al. |
| 9,054,767 B2 | 6/2015 | Razaviyayn et al. |
| 9,059,751 B2 | 6/2015 | Nosratinia et al. |
| 9,100,048 B2 | 8/2015 | Carlach et al. |
| 9,100,075 B2 | 8/2015 | Lorca Hernando |
| 9,106,315 B2 | 8/2015 | Hanson et al. |
| 9,160,437 B2 | 10/2015 | Ajima et al. |
| 9,160,643 B2 | 10/2015 | Gao et al. |
| 9,184,962 B2 | 11/2015 | Tarlazzi et al. |
| 9,203,496 B2 | 12/2015 | Fakhrai et al. |
| 9,231,670 B2 * | 1/2016 | Schmid | H04B 7/0413 |
| 2003/0002604 A1 | 1/2003 | Fifield et al. |
| 2004/0100930 A1 | 5/2004 | Shapira et al. |
| 2004/0106435 A1 | 6/2004 | Bauman et al. |
| 2005/0143091 A1 | 6/2005 | Shapira et al. |
| 2005/0249245 A1 | 11/2005 | Hazani et al. |
| 2005/0266902 A1 | 12/2005 | Khatri et al. |
| 2006/0063494 A1 | 3/2006 | Zhang et al. |
| 2006/0202890 A1 | 9/2006 | Otto |
| 2006/0233200 A1 | 10/2006 | Fifield et al. |
| 2007/0104165 A1 | 5/2007 | Hanaoka et al. |
| 2007/0177494 A1 | 8/2007 | Tomizawa |
| 2007/0259643 A1 * | 11/2007 | Wu | H04B 1/0096 |
| | | | 455/315 |
| 2007/0274253 A1 | 11/2007 | Zhang et al. |
| 2007/0274279 A1 | 11/2007 | Wood et al. |
| 2008/0056332 A1 | 3/2008 | Lakkis |
| 2008/0095259 A1 | 4/2008 | Dyer et al. |
| 2008/0107202 A1 | 5/2008 | Lee et al. |
| 2008/0114580 A1 | 5/2008 | Chin et al. |
| 2008/0175175 A1 | 7/2008 | Oren et al. |
| 2008/0180190 A1 | 7/2008 | Chan et al. |
| 2008/0191941 A1 | 8/2008 | Saban et al. |
| 2008/0192855 A1 * | 8/2008 | Shapira | G01S 3/023 |
| | | | 375/267 |
| 2008/0198955 A1 | 8/2008 | Oren et al. |
| 2008/0200117 A1 | 8/2008 | Oren et al. |
| 2008/0232305 A1 | 9/2008 | Oren et al. |
| 2008/0284647 A1 | 11/2008 | Oren et al. |
| 2009/0080547 A1 | 3/2009 | Naka et al. |
| 2009/0092201 A1 * | 4/2009 | Luo | H04B 7/0669 |
| | | | 375/267 |
| 2009/0124214 A1 | 5/2009 | Zhang et al. |
| 2009/0135944 A1 | 5/2009 | Dyer et al. |
| 2009/0141691 A1 | 6/2009 | Jain |
| 2009/0180426 A1 | 7/2009 | Sabat et al. |
| 2009/0219976 A1 | 9/2009 | Oren et al. |
| 2009/0227203 A1 * | 9/2009 | Guerreri | H03D 7/16 |
| | | | 455/39 |
| 2009/0316608 A1 * | 12/2009 | Singh | H04B 7/15507 |
| | | | 370/280 |
| 2009/0316609 A1 | 12/2009 | Singh |
| 2010/0029320 A1 | 2/2010 | Malladi et al. |
| 2010/0062707 A1 | 3/2010 | Gou et al. |
| 2010/0115358 A1 | 5/2010 | Kotecha et al. |
| 2010/0246516 A1 * | 9/2010 | Pelletier | H04B 7/0404 |
| | | | 370/329 |
| 2010/0272202 A1 | 10/2010 | Matsumoto et al. |
| 2010/0278530 A1 * | 11/2010 | Kummetz | H04W 88/085 |
| | | | 398/41 |
| 2011/0002410 A1 | 1/2011 | Forenza et al. |
| 2011/0002411 A1 | 1/2011 | Forenza et al. |
| 2011/0003608 A1 | 1/2011 | Forenza et al. |
| 2011/0077044 A1 | 3/2011 | Sampath et al. |
| 2011/0135308 A1 | 6/2011 | Tarlazzi et al. |
| 2011/0182217 A1 | 7/2011 | Schmid et al. |
| 2011/0201368 A1 * | 8/2011 | Faccin | H04B 7/0413 |
| | | | 455/507 |
| 2011/0235622 A1 | 9/2011 | Kasher |
| 2011/0263215 A1 | 10/2011 | Asplund et al. |
| 2011/0268203 A1 | 11/2011 | Chockalingam et al. |
| 2011/0292863 A1 | 12/2011 | Braz et al. |
| 2011/0317679 A1 | 12/2011 | Jain |
| 2012/0027145 A1 * | 2/2012 | Uyehara | H04J 3/0685 |
| | | | 375/356 |
| 2012/0120998 A1 | 5/2012 | Fakhrai et al. |
| 2012/0213254 A1 | 8/2012 | Yokouchi et al. |
| 2012/0230380 A1 * | 9/2012 | Keusgen | H04B 7/0482 |
| | | | 375/227 |
| 2012/0257659 A1 * | 10/2012 | Braz | H04L 7/06 |
| | | | 375/222 |
| 2012/0281622 A1 | 11/2012 | Saban et al. |
| 2012/0321314 A1 | 12/2012 | Oren et al. |
| 2012/0329523 A1 * | 12/2012 | Stewart | H03F 1/3247 |
| | | | 455/562.1 |
| 2013/0028304 A1 | 1/2013 | Murata |
| 2013/0051404 A1 | 2/2013 | Binder et al. |
| 2013/0058281 A1 | 3/2013 | Berlin et al. |
| 2013/0077658 A1 | 3/2013 | Hui et al. |
| 2013/0078927 A1 | 3/2013 | Razaviyayn et al. |
| 2013/0114650 A1 | 5/2013 | Li et al. |
| 2013/0136202 A1 * | 5/2013 | Kummetz | H04L 25/05 |
| | | | 375/267 |
| 2013/0159817 A1 | 6/2013 | Carlach et al. |
| 2013/0188753 A1 * | 7/2013 | Tarlazzi | H04J 14/0247 |
| | | | 375/299 |
| 2013/0195467 A1 * | 8/2013 | Schmid | H04B 1/0096 |
| | | | 398/115 |
| 2013/0279417 A1 | 10/2013 | Binder et al. |
| 2013/0295980 A1 | 11/2013 | Reuven et al. |
| 2013/0329825 A1 | 12/2013 | Oren et al. |
| 2013/0343474 A1 | 12/2013 | Nosratinia et al. |
| 2014/0016583 A1 * | 1/2014 | Smith | H04J 14/0227 |
| | | | 370/329 |
| 2014/0056389 A1 | 2/2014 | Lee et al. |
| 2014/0064399 A1 | 3/2014 | Oren et al. |
| 2014/0072071 A1 | 3/2014 | Berlin et al. |
| 2014/0079077 A1 | 3/2014 | Saban et al. |
| 2014/0087742 A1 * | 3/2014 | Brower | H04B 10/2575 |
| | | | 455/450 |
| 2014/0119735 A1 | 5/2014 | Cune et al. |
| 2014/0135038 A1 | 5/2014 | Shapira et al. |
| 2014/0153918 A1 | 6/2014 | Hazani |
| 2014/0153919 A1 | 6/2014 | Casterline et al. |
| 2014/0161164 A1 | 6/2014 | Emmanuel et al. |
| 2014/0180581 A1 * | 6/2014 | Berlin | G06F 17/40 |
| | | | 701/491 |
| 2014/0211875 A1 | 7/2014 | Berlin et al. |

(56) References Cited

U.S. PATENT DOCUMENTS

| | | |
|---|---|---|
| 2014/0247791 A1 | 9/2014 | Seo et al. |
| 2014/0269358 A1 | 9/2014 | Gao et al. |
| 2014/0269859 A1 | 9/2014 | Hanson et al. |
| 2014/0269966 A1 | 9/2014 | Faccin et al. |
| 2014/0286463 A1* | 9/2014 | Reingold ............ H04B 7/0456 375/347 |
| 2014/0301496 A1* | 10/2014 | Ko ...................... H04B 7/0639 375/267 |
| 2014/0348260 A1* | 11/2014 | Lorca Hernando .. H04B 7/0617 375/295 |
| 2015/0023444 A1* | 1/2015 | Tarlazzi ............. H04J 14/0247 375/267 |
| 2015/0023453 A1* | 1/2015 | Ajima ................ H04B 7/0456 375/340 |
| 2015/0031316 A1 | 1/2015 | Berlin et al. |
| 2015/0035705 A1 | 2/2015 | Anolik et al. |
| 2015/0038185 A1 | 2/2015 | Saban et al. |
| 2015/0093106 A1 | 4/2015 | Hazani |
| 2015/0110013 A1 | 4/2015 | Zhang et al. |
| 2015/0131632 A1 | 5/2015 | Hazani et al. |
| 2015/0139346 A1 | 5/2015 | Ko et al. |
| 2015/0188582 A1 | 7/2015 | Kahrizi et al. |
| 2015/0195055 A1 | 7/2015 | Ben-Shlomo |
| 2015/0207558 A1* | 7/2015 | Braz ................. H04B 7/15542 370/315 |
| 2015/0215921 A1 | 7/2015 | Zhang et al. |
| 2015/0249965 A1* | 9/2015 | Dussmann ........... H03G 3/3042 455/501 |
| 2015/0319699 A1* | 11/2015 | Bar-David ........... H03F 1/0222 370/252 |
| 2015/0349868 A1* | 12/2015 | Sawai ................ H04B 7/0413 375/267 |
| 2016/0065256 A1* | 3/2016 | Yun .................... H04B 1/1027 375/349 |
| 2016/0164648 A1* | 6/2016 | Moon .................. H04N 7/08 370/312 |
| 2016/0164800 A1* | 6/2016 | Eitan ................. H04B 7/0413 370/389 |
| 2016/0173308 A1* | 6/2016 | Yoon ................. H04L 27/2607 370/208 |

FOREIGN PATENT DOCUMENTS

| | | |
|---|---|---|
| WO | 9722186 A1 | 6/1997 |
| WO | 9827748 A2 | 6/1998 |
| WO | 9831133 A2 | 7/1998 |
| WO | 9955012 A2 | 10/1999 |
| WO | 0110156 | 2/2001 |
| WO | 0225506 | 3/2002 |
| WO | 2005048401 A1 | 5/2005 |
| WO | 2007054945 A2 | 5/2007 |
| WO | 2007133630 A2 | 11/2007 |
| WO | 2008004955 A2 | 1/2008 |
| WO | 2008027531 A2 | 3/2008 |
| WO | 2008076432 A1 | 6/2008 |
| WO | 2008088859 A2 | 7/2008 |
| WO | 2008088862 A1 | 7/2008 |
| WO | 2008097651 A1 | 8/2008 |
| WO | 2008099383 A2 | 8/2008 |
| WO | 2008099390 A2 | 8/2008 |
| WO | 2008103374 A2 | 8/2008 |
| WO | 2008103375 A2 | 8/2008 |
| WO | 2009002938 A2 | 12/2008 |
| WO | 2009053910 A2 | 4/2009 |
| WO | 2009081376 A2 | 7/2009 |
| WO | 2009138876 A2 | 11/2009 |
| WO | 2009155602 A1 | 12/2009 |
| WO | 2010013142 A1 | 2/2010 |
| WO | 2010059103 A1 | 5/2010 |
| WO | 2010060490 A1 | 6/2010 |
| WO | 2010075865 A1 | 7/2010 |
| WO | 2010089719 A1 | 8/2010 |
| WO | 2011057750 | 5/2011 |
| WO | 2011071870 A1 | 6/2011 |
| WO | 2011100219 A1 | 8/2011 |
| WO | 2012044969 A1 | 4/2012 |
| WO | 2012075137 A1 | 6/2012 |

OTHER PUBLICATIONS

Four-Page Tarlazzi, et al. "Characterization of an Interleaved F-DAS MIMO Indoor Propagation Channel", Nov. 8-9, 2010, Loughborough, UK, pp. 505-508.

Thirteen-Page Written Opinion and Search Report mailed Feb. 24, 2012 for PCT Application PCT/US2011/054281.

China Patent Office, "Notice of Grant for CN Application No. 201180047543.3", "from Foreign Countpart to U.S. Appl. No. 13/796,978", Apr. 7, 2016, pp. 13, Published in: CN.

China Patent Office, "Office Action for CN Application No. 201180047543.3", "from Foreign Counterpart to U.S. Appl. No. 13/796,978", 3118/2015, pp. 1-29, Published in: CN.

China Patent Office, "Office Action for Cn Application No. 201180047543.3", "from Foreign Counterpart to U.S. Appl. No. 13/796,978", 10119/2015, pp. 15, Published in: CN.

U.S. Patent Office, "Notice of Allowance", "from U.S. Appl. No. 13/796,978", Aug. 19, 2015, pp. 115, Published in: US.

U.S. Patent Office, "Office Action", "from U.S. Appl. No. 13/796,978", Jan. 15, 2015, pp. 153, Published in: US.

* cited by examiner

DISTRIBUTED ANTENNA SYSTEM FOR MIMO SIGNALS

CROSS-REFERENCE TO RELATED APPLICATIONS

This application is a Continuation application of U.S. application Ser. No. 13/796,978, filed Mar. 12, 2013, entitled "DISTRIBUTED ANTENNA SYSTEM FOR MIMO SIGNALS", which application is a Continuation application of International PCT Application No. PCT/US2011/054281, filed Sep. 30, 2011, entitled "DISTRIBUTED ANTENNA SYSTEM FOR MIMO SIGNALS", which claims priority to and the filing benefit of U.S. Provisional Patent Application Ser. No. 61/388,973 filed on Oct. 1, 2010, entitled "DISTRIBUTED ANTENNA SYSTEM FOR MIMO SIGNALS", which applications are all incorporated by reference herein in their entireties.

FIELD OF THE INVENTION

Embodiments of the invention are directed to wireless communication systems, and specifically directed to distributed antenna systems for wireless MIMO communications.

BACKGROUND OF THE INVENTION

A contemporary wireless communication system for repeating wireless signals, such as distributed antenna system 10, is shown in FIG. 1, and includes a number of remote units 12 distributed to provide coverage within a service area of the system 10. In particular, each remote antenna unit 12 typically includes an antenna 14 and suitable electronics. Each remote unit is coupled to a master unit 16 with a suitable media, such as a coaxial cable or optical fiber. Each master unit 16 is, in turn, coupled to an RF combination network 18 that combines the signals from one or more (1-N) base transceiver stations ("BTS," or more simply, "base station") 20 (hereinafter, "BTS" 20). As illustrated in FIG. 1, the system 10 may include a plurality of master units 16 and may couple to a plurality of BTSs 20, each master unit 16 configured to provide a combination of the signals from the BTSs 20 to the various remote units 12. The link 21 between the BTSs 20 and the RF combination network 18 and various master units 16 may be a wired or wireless link.

In FIG. 1, each remote unit 12 broadcasts a wireless signal 24 that, in turn, is transceived with a wireless device 26 that may be a mobile device, such as a telephone device or a computing device. In particular, and as discussed above, the wireless signal 24 from each remote unit 12 may be a combination of signals from the BTSs 20. Thus, the wireless device 26 may communicate with the system 10 through any of the wireless signals 24 from the remote units 12. Specific embodiments of the system 10 illustrated in FIG. 1 may include ION-B systems and ION-M systems, both of which are distributed by Andrew LLC, a division of CommScope, Inc., of Hickory, N.C.

To improve wireless communications, such as communications from a base station to mobile devices, Multiple-Input/Multiple-Output ("MIMO") technology might be utilized to provide advanced solutions for performance enhancement and broadband wireless communication systems. Substantial improvements may be realized utilizing MIMO techniques with respect to the traditional SISO systems. MIMO systems have capabilities that allow them to fully exploit the multi-path richness of a wireless channel. This is in contrast with traditional techniques that try to counteract multi-path effects rather than embrace them. MIMO systems generally rely upon multi-element antennas at both of the ends of the communication links, such as in the base station and also in the wireless device. In addition to desirable beam-forming and diversity characteristics, MIMO systems also may provide spatial multiplexing gain, which allows multi data streams to be transmitted over spatially-independent parallel sub-channels. This may lead to a significant increase in the system capacity without extending the bandwidth requirements. Generally, a SISO system, such as that illustrated in FIG. 1, cannot increase spectral efficiency by taking advantage of spatial MIMO technology.

For example, the wireless device 26 of FIG. 1 receives one signal communication signal only, though it may be in the range of a plurality of remote units 12. The wireless signals 24 from each remote unit are typically at the same frequency and carry the same data, and communication between a plurality of remote units 12 and the wireless device 26 simultaneously may result in signal degradation and collisions. In a best case scenario, the multipath nature of the communication channel can be turned into an advantage by sophisticated equalizer algorithms. However, data bandwidth from the wireless device 26 is constricted to the speed of reception and processing of data from one remote unit 12.

It is therefore, desirable to take advantage of spatial MIMO signals within a distributed antenna system.

SUMMARY OF THE INVENTION

Embodiments of the invention provide a distributed antenna system ("DAS") that is configured to operate in a multiple-input and multiple-output ("MIMO") mode of operation. Alternative embodiments of the invention provide a DAS that normally operates in a single-input and single-output ("SISO") mode of operation but that has been converted to operate in a MIMO mode of operation with the addition of specified components.

BRIEF DESCRIPTION OF THE DRAWINGS

FIG. 5A is a diagrammatic illustration of a downlink portion of a conversion module in the master unit of the MIMO DAS of FIG. 2A, 3A, or 4A, while

FIG. 5C is a diagrammatic illustration of a downlink portion of a conversion module in the remote unit and/or extension unit of the MIMO DAS of FIG. 2A, 3A, or 4A, while

It should be understood that the appended drawings are not necessarily to scale, presenting a somewhat simplified representation of various preferred features illustrative of the basic principles of embodiments of the invention. The specific design features of the system and/or sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION OF THE INVENTION

Figure 1:
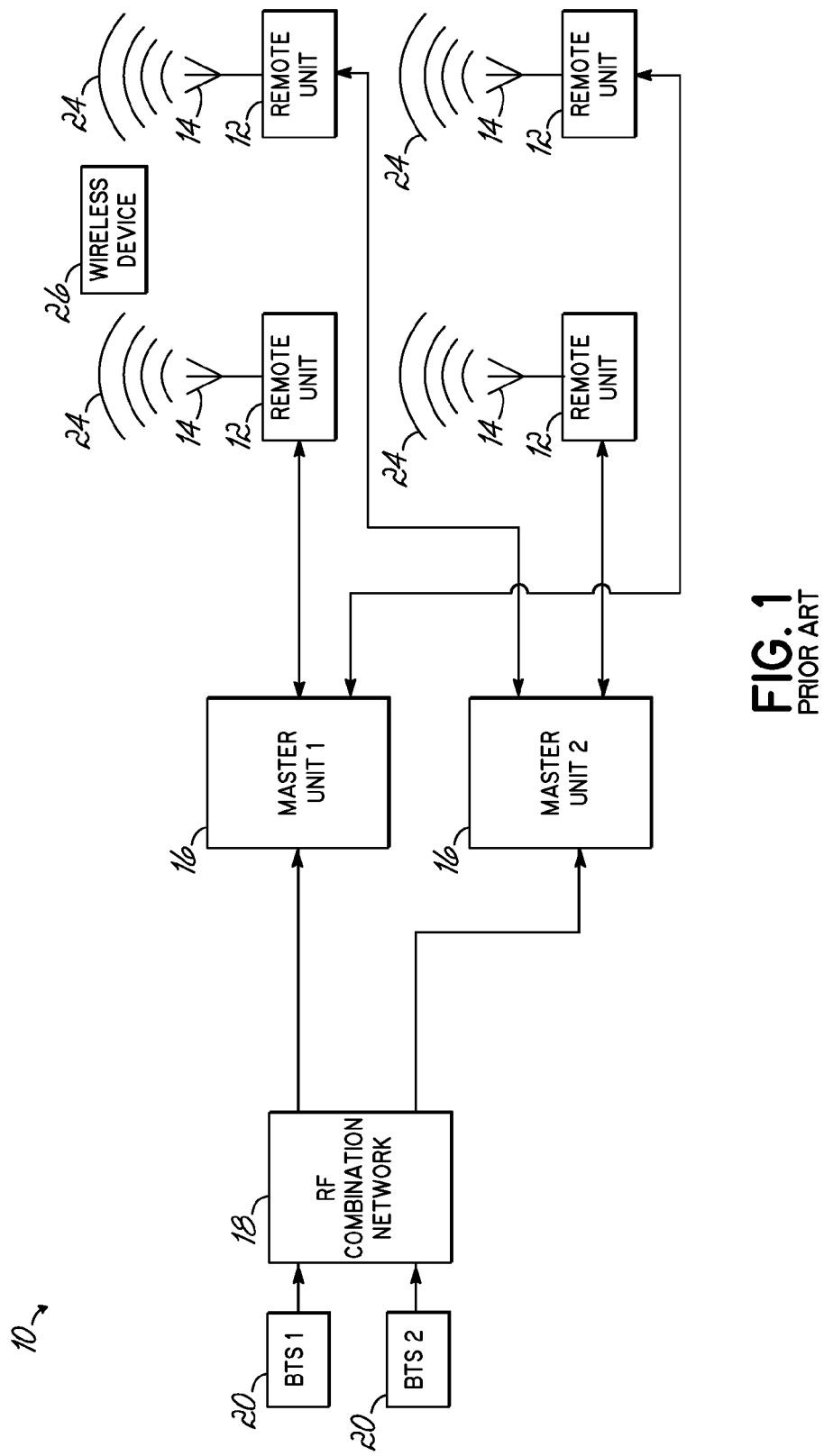
FIG. 1 is a block diagram of a contemporary distributed antenna system.
Figure 2A:
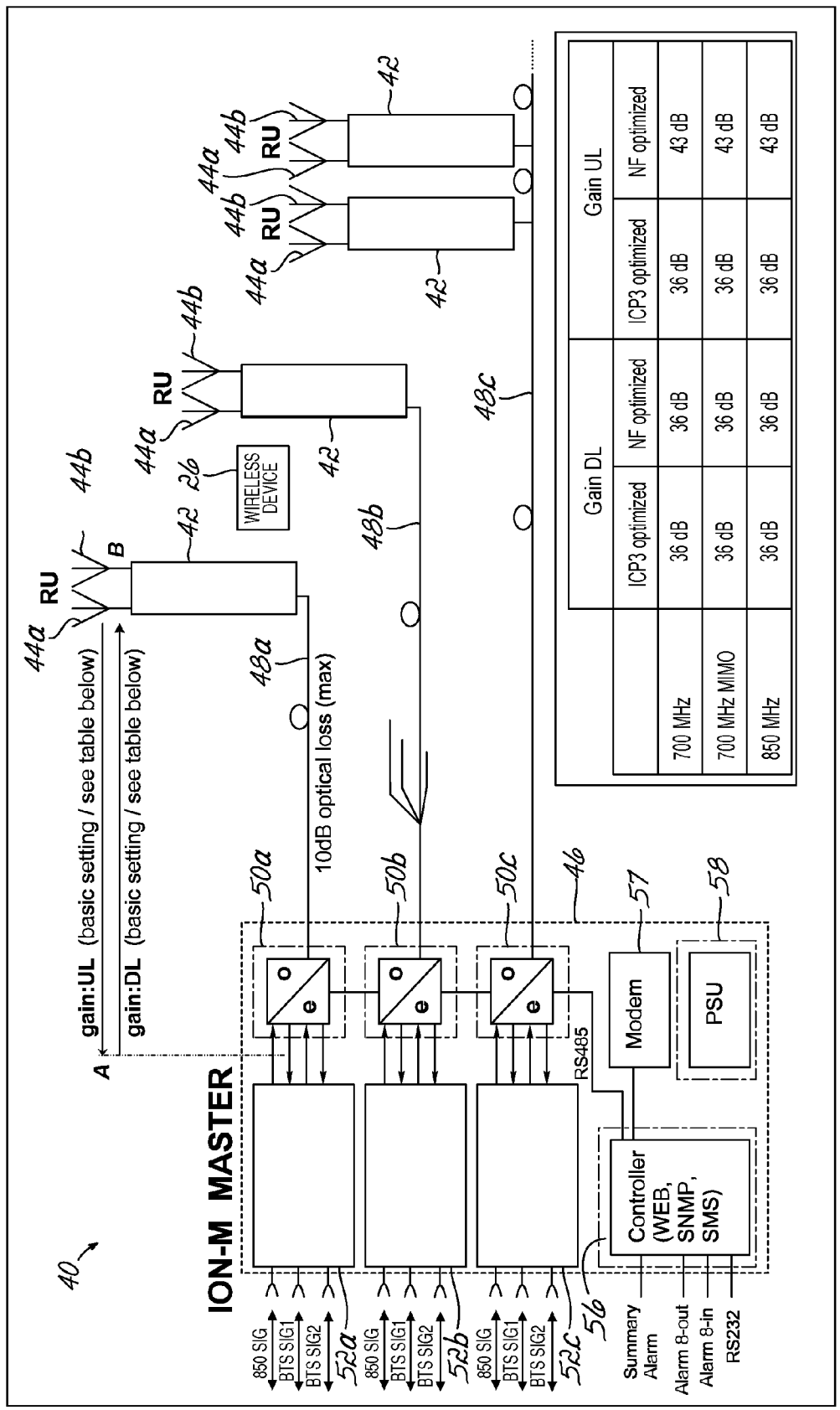
FIG. 2A is a block diagram of a MIMO distributed antenna system ("DAS") that includes a master unit communicating at least three signals to a remote unit consistent with embodiments of the invention.

FIG. 2A is a diagrammatic illustration of a MIMO DAS 40 consistent with embodiments of the invention that further shows downlink ("DL") and uplink ("UL") gain of that MIMO DAS 40. The MIMO DAS 40 includes a plurality of remote units 42 distributed to provide coverage within a service area of the MIMO DAS 40, such as inside a building or some other enclosed area. Each remote unit 42, in turn, includes at least two antennas 44a-b and suitable electronics. In various of the disclosed embodiments, a 2×2 MIMO arrangement is illustrated or discussed. It should be understood that other MIMO scenarios, such as 4×4 or 8×8, etc., would also benefit from the invention. Each remote unit 42 is coupled to a master unit 46 through at least one optical link 48, which may include one or more optical fibers (not shown), optical splitters (not shown), or other optical transmission components (not shown). As illustrated in FIG. 2A, one remote unit 42 may be connected directly to the master unit 46 through a direct optical link, such as at link 48a. Alternatively, a plurality of remote units 42 may be connected to the master unit 46 in a series connection optical link, such as at link 48b. Or a plurality of remote units 42 may be connected to the master unit 46 in a tree connection optical link, such as at link 48c. The master unit 46 is configured with a respective electrical-to-optical conversion circuit 50 for each optical link 48 to convert electrical signals at the master unit 46 to optical signals for transmission over the respective optical links 48.

In the downlink direction (e.g., from the master unit 46 to the remote unit 42), the master unit 46 receives at least one signal from at least one MIMO BTS (not shown in FIG. 2A). The master unit 46 may receive signals from other BTSs as well. Specifically, the master unit 46 may receive the signals for the remote units 42 over an input optical link (not shown), or some other suitable fashion, then separate and/or combine the signals within a particular optical link for transmission over the optical link 48 to the remote units 42. The signals from the BTSs may be electrical RF signals, or in some other form for processing. As illustrated in FIG. 2A, the master unit 46 receives two signals from at least one MIMO BTS (illustrated as "BTS SIG1" and "BTS SIG2") as well as a signal in the 850 MHz frequency band (illustrated as "850 SIG") at a first input optical link.

The master unit 46 may frequency convert and/or combine the signals received at an input optical link for the remote unit 42 in a conversion module 52, in accordance with aspects of the invention. Conversion modules 52a-c are illustrated in FIG. 2A for handling the various BTS signals. The master unit 46 then converts the electrical signals to optical signals with appropriate electrical-to-optical circuits 50 (50a, 50b, and 50c) and transmits or sends the optical signals to the remote units 42. Similar frequency conversion, combining, and electrical-to-optical conversion takes place for the various optical links 48a-c. In the uplink direction (from the remote unit 42 to the master unit 46), the master unit 46 receives optical signals from the remote units 42 and converts the signals from optical signals to electrical signals, then may split and/or frequency convert the signals prior to sending them to the MIMO BTS as discussed further herein.

In the downlink direction (e.g., from the master unit 46 to the remote unit 42), the master unit 46 of the embodiment of FIG. 2A is configured to receive various communication signals in suitable frequency bands as used by service providers, such as a signal in the 850 MHz communication range labeled "850 SIG". Some such signals might be typical signals for conventional SISO systems. The master unit 46 is also configured to receive and process a plurality of MIMO signals for MIMO services. In accordance with one aspect of the invention, the MIMO signals are frequency converted so that the multiple MIMO signals may be handled over a single fiber-optic cable in the uplink and/or downlink directions without loss of the benefits of those multiple signals, such as diversity and spatial multiplexing gain benefits. For example, in accordance with one exemplary embodiment of the invention, the MIMO signals may be in a 700 MHz range, including a first MIMO signal, such as that labeled "BTS SIG1". BTS SIG1 is frequency converted or translated to a signal that falls into a first frequency band FB1. A second MIMO signal in the 700 MHz communication range, such as that labeled "BTS SIG2", is frequency converted to a signal that falls into a second frequency band FB2 (See FIG. 5A). The first frequency band FB1 is different from the second frequency band FB2 so that the signals may be combined on a single fiber-optic cable while maintaining their unique MIMO information. Referring to FIG. 2A, the master unit 46 then combines the signals in the 850 MHz frequency band, the frequency converted MIMO signals and an LO reference having an LO frequency LO1. The master unit 46 directs the combined signals to a remote unit 42 through the optical link 48. As seen in FIG. 2A, the various downlink signals are appropriately converted from electrical to optical signals, and are then transmitted over fiber link 48 to one or more remote units.

In the uplink direction (e.g., to the master unit 46 from the remote unit 42), the master unit 42 is configured to receive the first signal in the 850 MHz communication range. The master unit 46 also receives uplink MIMO signals in a third frequency band FB3 or a fourth frequency band FB4 and converts the signals into uplink MIMO signals with a frequency at their original MIMO frequency. The master unit also receives additional MIMO signals from an additional antenna at the remote unit in a fifth frequency band FB5 or a sixth frequency band FB6 and converts the signals into uplink MIMO signals with a frequency at the frequency of the original MIMO signals, such as in the 700 MHz band (See FIG. 5B). In the uplink direction, the uplink MIMO signals might be received in various uplink MIMO sub-bands. Therefore, for frequency conversion, those MIMO uplink sub-bands may be converted to appropriate sub-bands F3/F4 and F/5/F6 associated with each of the multiple MIMO antennas. The master unit 46 then sends the frequency converted plurality of MIMO signals back to the MIMO BTS. Similar operations may occur for each of the signals for the other optical paths 48b-c depending on whether they are frequency converted MIMO signals or non-MIMO signals. While only one particular portion of the master unit 46 and specific remote unit 42 are discussed with respect to the MIMO aspect of the invention in FIG. 2A, it will be understood that the other portions and various associated remote units 42 might also handle MIMO signals.

In some embodiments of the invention, the DAS system and the master unit 46 may be an ION-M series system and master units as distributed by Andrew LLC, a division of CommScope, Inc. of Hickory, N.C. The master unit 46 thus includes a controller 56 that operates similar to previous controllers 56 for ION-M master units 46. As such, the controller 56 controls the operation of the master unit 46 and can be configured across the Internet (the Web) as well as using simple network management protocol ("SNMP") communications or short messaging service ("SMS") communications. The controller 56, in turn, manages the operation of the master unit 46, such as the operation of the electrical-to-optical circuits 50a-c through RS485 communications, as well as a modem 57. The controller 56 is also configured to receive data, such as through the modem 57, from a service computer through RS232, summary alarm messages, and data about alarm messages. In turn, the controller 56 outputs data about alarm messages. With respect to the conversion modules 52a-c, the controller 56 is further configured to provide alarms related thereto, such as a ConvMod X communication failure (indicating that communication with a conversion module X is lost), a ConvMod X Current alarm (indicating that a current monitored in a conversion module X is too high or too low, and a ConvMod X DL LO level too low (indicating that a local oscillator for a conversion module X has received too low a level). The master unit 46 also includes a power supply unit 58 to provide power thereto.

Figure 2B:
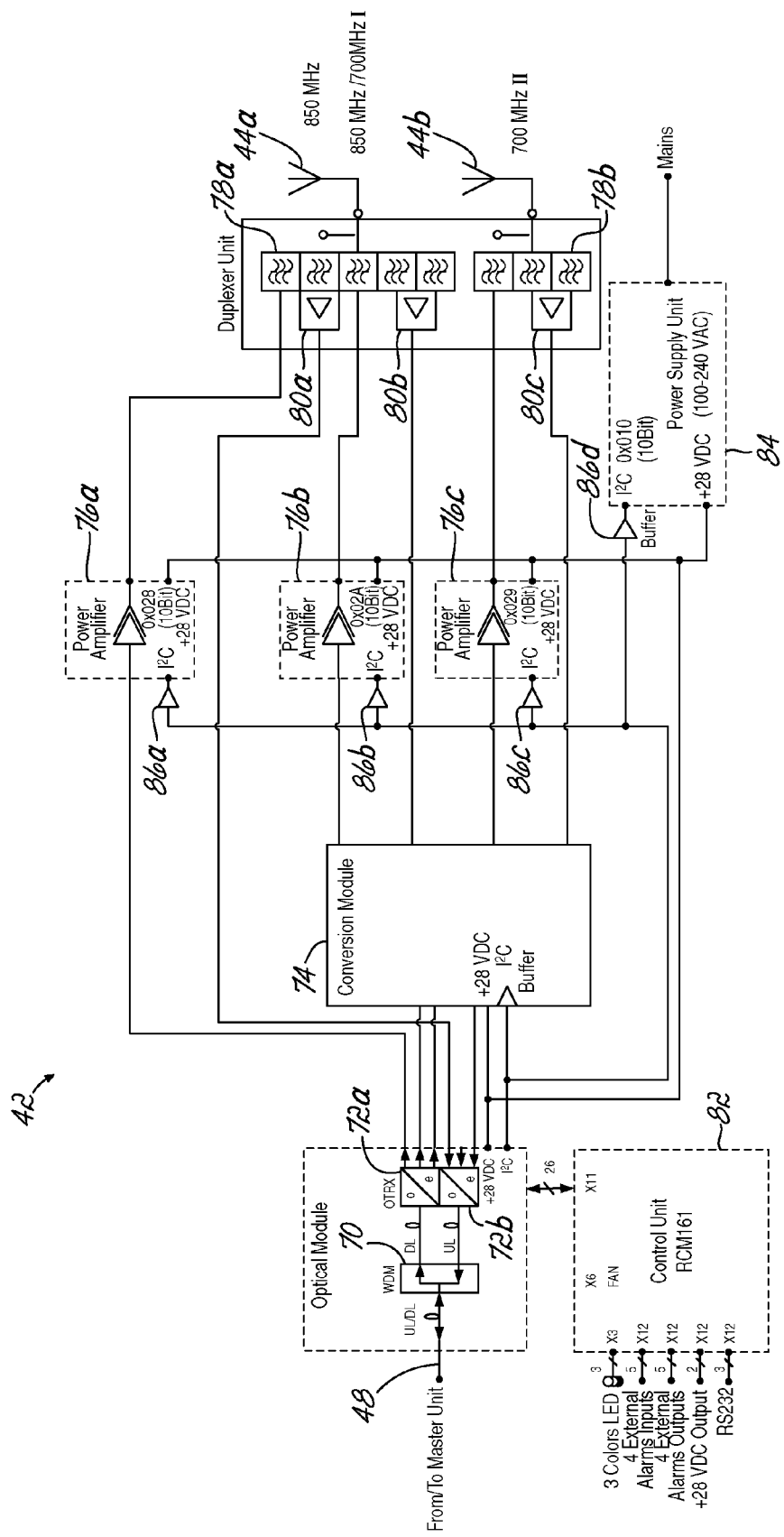
FIG. 2B is a block diagram of the remote unit of the MIMO DAS of FIG. 2A.

Turning to the remote unit 42, this may be an ION-M7P/7P/85P series repeater as also distributed by Andrew LLC. In the disclosed embodiment of FIG. 2B, the uplink and downlink paths between the remote unit 42 and master unit 46 are handled by a single fiber 48. FIG. 2B illustrates that the remote unit 42 may include a wave division multiplexer 68 to split the optical signals for the single fiber-optical link 48 into downlink and uplink signals. In the downlink direction (e.g., from the master unit 46 to the antennas 44a-b), the remote unit 42 converts the downlink signals from optical signals to electrical signals using an appropriate optical-to-electrical circuit 72a. Circuit 72a outputs the signal in the 850 MHz frequency band, the converted plurality of MIMO signals, and the LO signal LO1. The converted MIMO signals are processed by a conversion module 74, which frequency converts the converted MIMO signals back to a specific MIMO band, such as the 700 MHz MIMO band. Such a conversion module is discussed herein below.

Figure 5A:
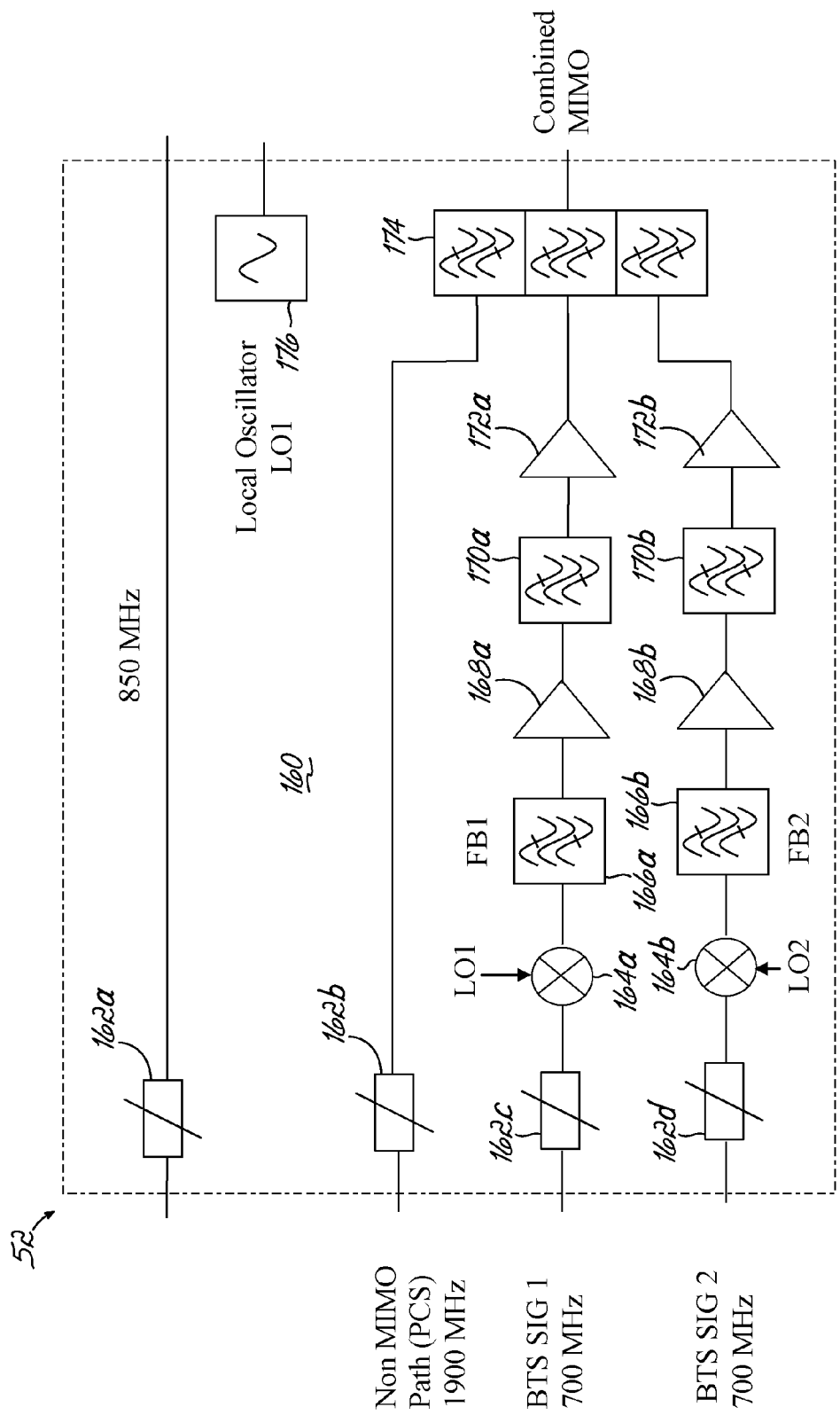
Figure 5B:
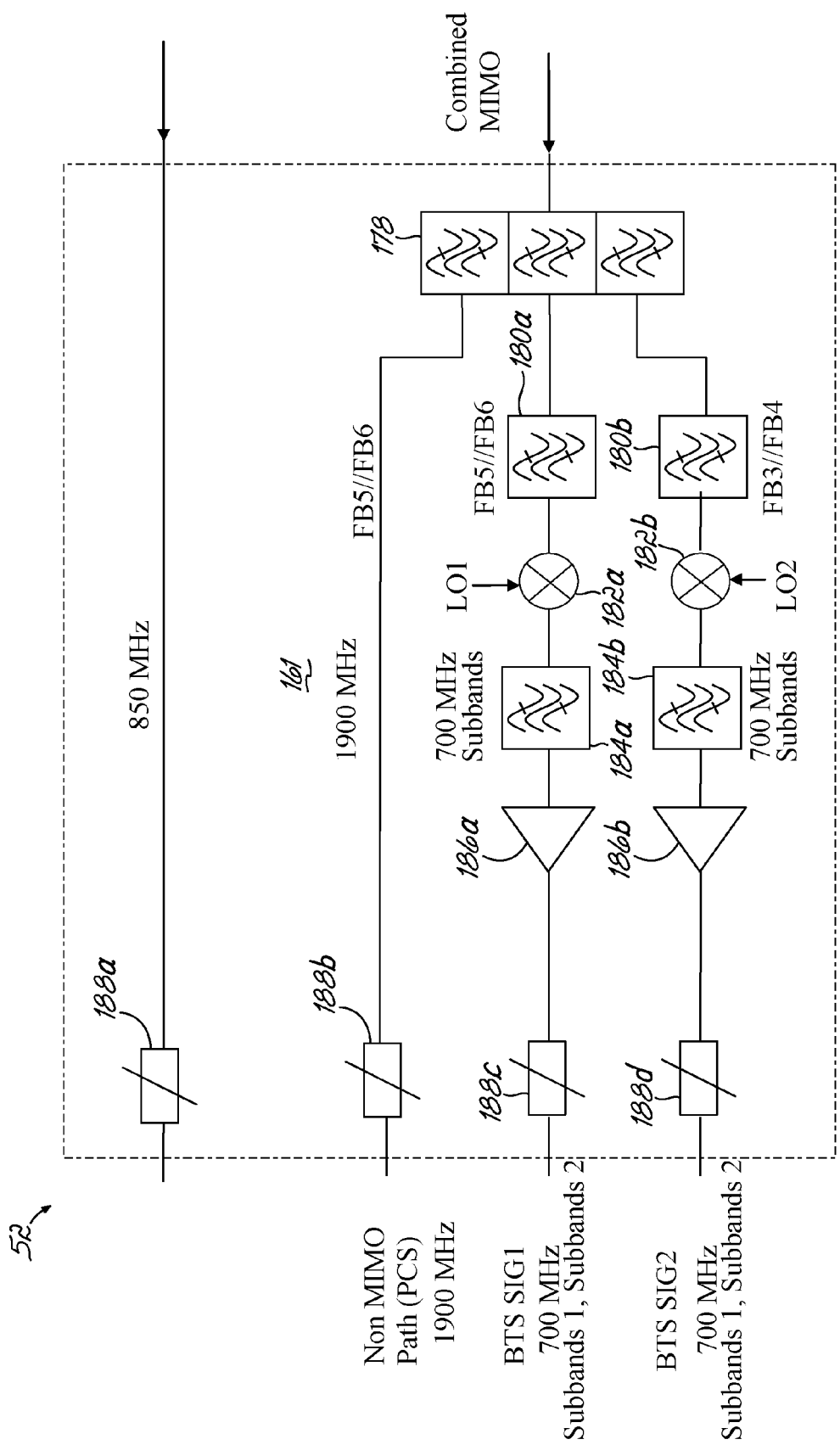
FIG. 5B is a diagrammatic illustration of an uplink portion of the conversion module in the master unit of the MIMO DAS of FIG. 2A, 3A, or 4A.
Figure 5C:
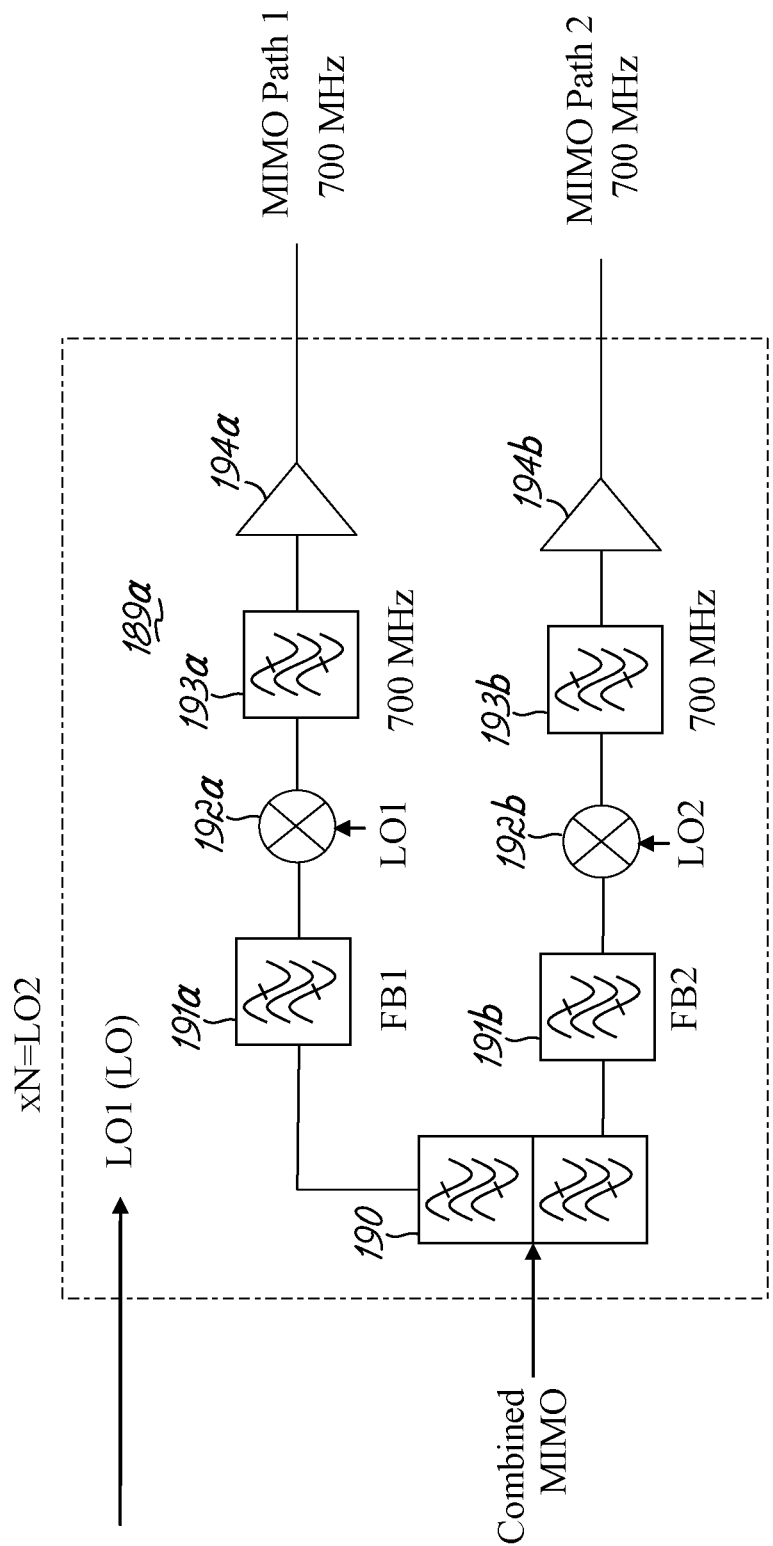

In particular, the conversion module 74 converts the downlink MIMO signals in the first and second frequency bands FB1, FB2 into MIMO signals in the original 700 MHz range (See FIG. 5C). The signals are then amplified and transmitted over an air interface by the remote unit. The remote unit 42 amplifies the downlink signals in the 850 MHz communication range and the plurality of MIMO signals with respective power amplifiers 76 (76a, 76b, and 76c). The signals are then directed to appropriate antennas. The signal in the 850 MHz communication range is combined with one of the MIMO signals in a first duplexer 78a for communication through the first antenna 44a. Another of the MIMO signals is processed through a second duplexer 78b for transmission by the second antenna 44b. As such, the remote unit 42 is configured to send and/or receive signals, such as from a wireless device 26, which may also be MIMO enabled and include multiple antennas. As discussed herein, the embodiments discuss essentially two MIMO signals and a remote unit 42 with two antennas 44a-b. However, as noted above, it will be readily understood that the invention is also applicable with systems using a greater number of MIMO signals than two.

In the uplink direction (e.g., from the remote unit 42 to the master unit 46), the remote unit 42 separates the signal in the 850 MHz communication range from one of the MIMO signals, which has a frequency in one of the 700 MHz sub-bands used for uplink MIMO signals, via the duplexer 78a. The other MIMO signal also has a frequency in one of the 700 MHz MIMO sub-bands. The duplexer, in the uplink, is configured to handle the different frequency bands or sub-bands associated with the MIMO uplink signals.

The remote unit 42 then amplifies the 850 MHz and MIMO uplink signals via respective amplifiers 80a-c, such as LNAs, and then frequency converts the MIMO signals in the conversion module 74. In particular, the remote unit 42 converts one of the MIMO signals to a frequency in the third or fourth frequency band or sub-band FB3, FB4, and converts the other MIMO signal to a frequency in the fifth or sixth frequency band or sub-band FB5, FB6. The conversion module 74 then combines the multiple MIMO signals, and the remote unit 42 provides the 850 MHz signal and the combined MIMO signals for conversion to optical signals to the electrical-to-optical circuit 72b. The remote unit 42 then wave division multiplexes the uplink optical signal onto an optical link 48 using the wave division multiplexer 70. A controller 82 controls the operation of the remote unit 42. As illustrated in FIG. 2B, the controller 82 is illustrated controlling the electrical-to-optical circuits 72a-b as well as monitoring power provided by a power supply unit 84 and through various buffers 86a-d, though one having ordinary skill in the art will appreciate that the controller 82 controls additional operations thereof, such as status, alarm management, and alarm reporting, as noted above.

As illustrated in FIGS. 2A and 2B, the MIMO DAS 40 may have a downlink gain in the 700 MHz frequency band (whether a normal communication band or a MIMO specific communication band) of about 36 dB, whether that gain is measured using ICP3 optimized methods or NF optimized methods. Moreover, the MIMO DAS 40 has a downlink gain in the 850 MHz frequency band) of about 36 dB, also whether that gain is measured using ICP3 optimized methods or NF optimized methods. Similar gains are illustrated in the 700 MHz frequency band, 700 MHz MIMO specific communication band, and 850 MHz frequency band for ICP3 optimized measurements of uplink gain. However, the MIMO DAS 40 includes, for uplink gain measured using NF optimized methods, about 43 dB of gain for the 700 MHz frequency band, 700 MHz MIMO specific communication band, and 850 MHz frequency band.

Figure 3A:
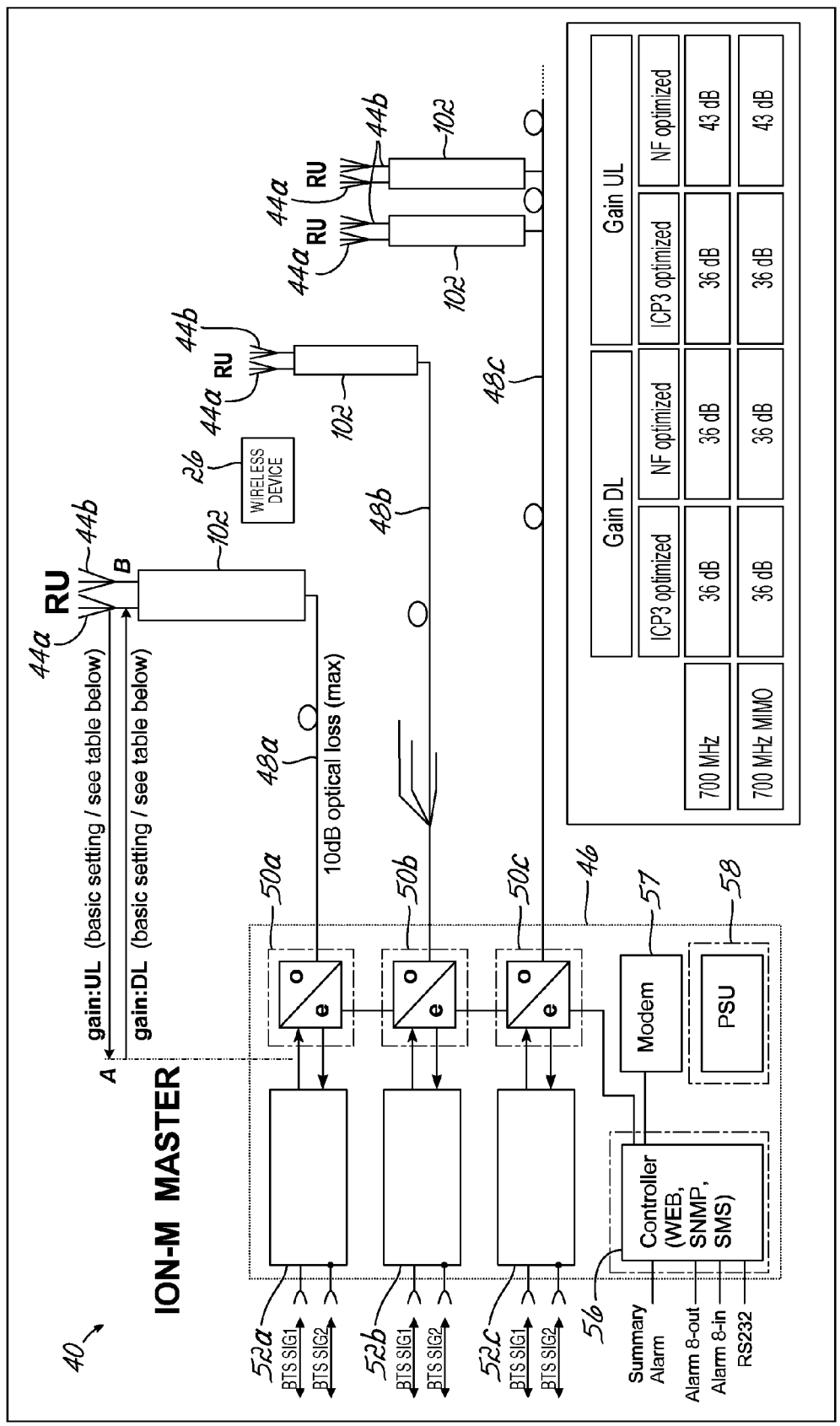
FIG. 3A is a block diagram of a MIMO DAS that includes a master unit communicating at least two signals to a remote unit consistent with embodiments of the invention.

In some embodiments, a DAS system might utilize dedicated MIMO remote units, rather than combining the MIMO service with other service frequency bands. As such, the master unit 46 may transceive the two signals from at least one MIMO BTS on an optical link 48a with one or more MIMO remote units 42. In particular, two or more MIMO signals in the 700 MHz frequency band (e.g., signals labeled "BTS SIG1" and "BTS SIG2") are utilized. FIG. 3A is a diagrammatic illustration of a MIMO DAS 100 that includes such a dedicated remote MIMO unit 102. The remote units 102 are configured to transmit two MIMO signals, such as BTS SIG1 and BTS SIG2 in a 700 MHz frequency band. As such, the remote units 102 of FIG. 3B include many similar components to the remote units 42 illustrated in FIG. 2B. It utilizes power amplifiers 76a-b, duplexers 78a-b, amplifiers 80a-b, such as LNAs, and buffers 86a-c. The frequency conversion module 74 converts the two signals similarly to the manner as disclosed above for the plurality of MIMO signals discussed in connection with FIG. 2B. The remote unit 102 transmits one MIMO signal via the first antenna unit 44a and transmits the other MIMO signal via the second antenna unit 44b. Thus, the remote unit 102 may be an ION-M7P/7P series repeater unit, as also distributed by Andrew LLC.

Figure 3B:
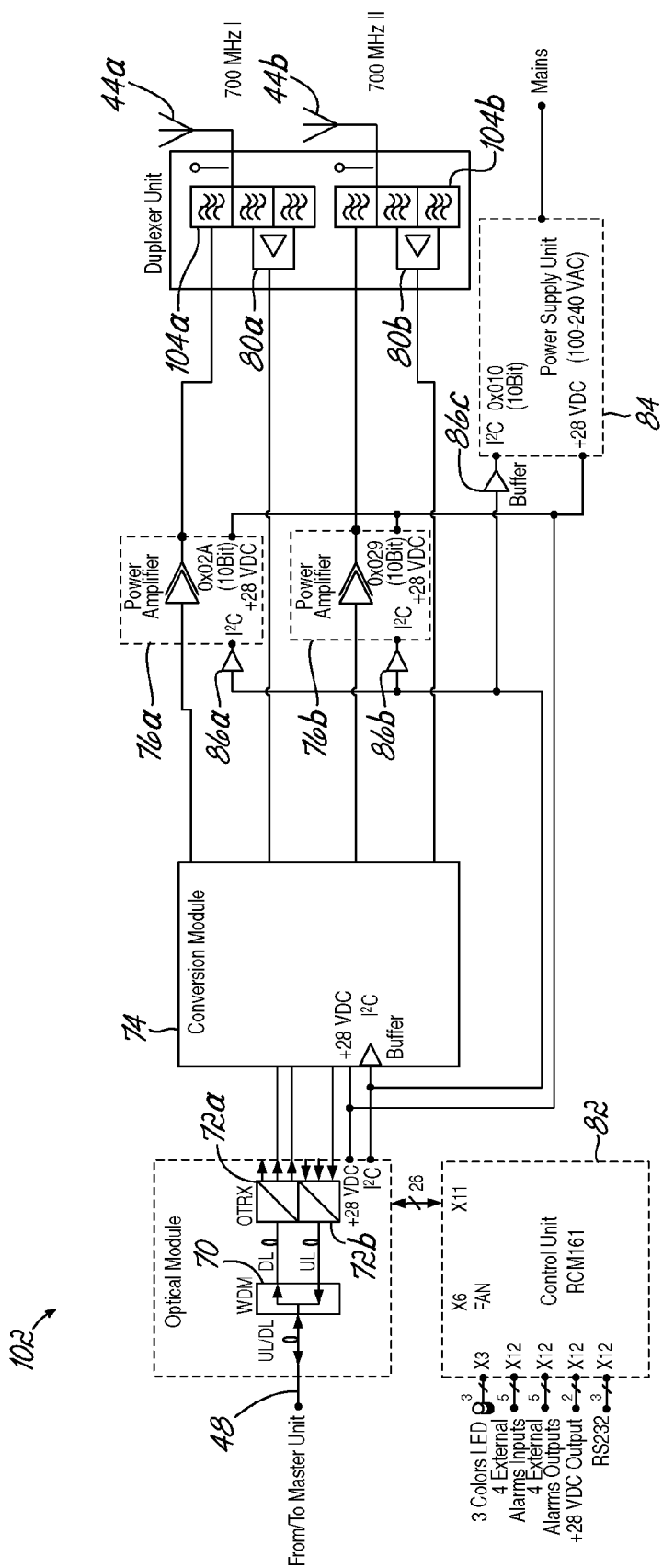
FIG. 3B is a block diagram of the remote unit of the MIMO DAS of FIG. 3A.

As illustrated in FIGS. 3A and 3B, the MIMO DAS 100 may have a downlink gain in the 700 MHz frequency band (whether a normal communication band or a MIMO specific communication band) of about 36 dB, whether that gain is measured using ICP3 optimized methods or NF optimized methods. Similar gains are illustrated in the 700 MHz frequency band and the 700 MHz MIMO specific communication band for ICP3 optimized measurements of uplink gain. However, the MIMO DAS 100 includes, for uplink gain measured using NF optimized methods, about 43 dB of gain for the 700 MHz frequency band and the 700 MHz MIMO specific communication band.

Figure 4A:
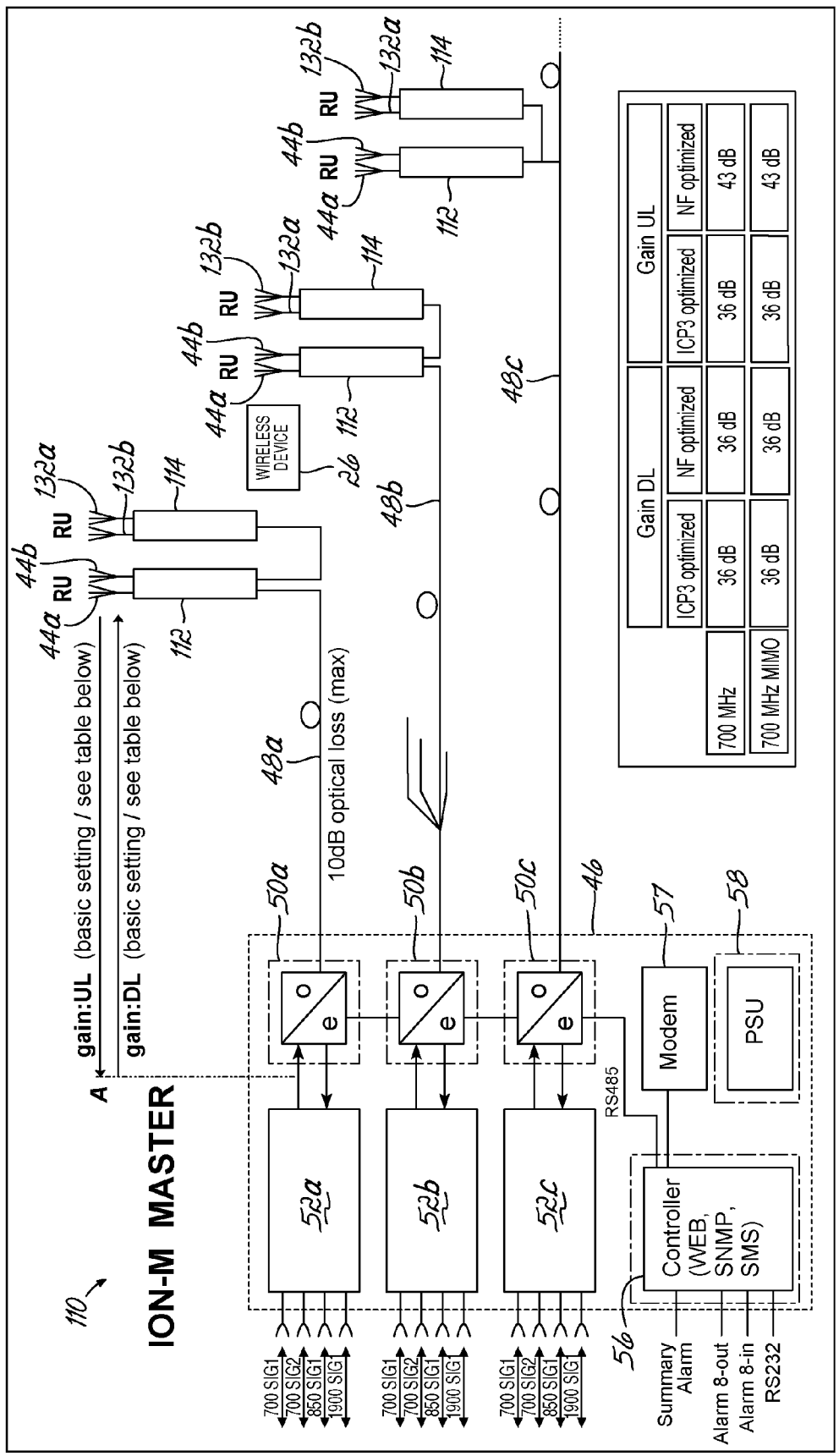
FIG. 4A is a block diagram of a MIMO DAS that includes a master unit communicating signals to a remote unit connected to an extension unit consistent with embodiments of the invention.

In various scenarios, legacy DAS systems may be set up as SISO systems without MIMO operable remote units. In alternative embodiments of the invention, an extension unit may be utilized in combination with the remote units to extend the range of a MIMO DAS. FIG. 4A is a diagrammatic illustration of a MIMO DAS 110 that includes a remote unit 112 configured to communicate with an extension unit 114 through an extension port. As illustrated in FIG. 4A, the master unit 46 may be configured to receive appropriate service signals from the BTS, including a signal in the 850 MHz frequency band labeled "850 SIG", as well as a signal in the 1900 MHz frequency band labeled "1900 SIG", and the master unit 46 also receives a plurality of MIMO signals in the 700 MHz frequency band. As such, the master unit 46 frequency converts MIMO signals in the 700 MHz frequency band to frequencies in the first or second frequency band FB1, FB2 and combines the frequency shifted MIMO signals with the signals in the 1900 MHz frequency band to send over the optical link. The master unit 46 then combines and sends the 850 SIG, the combined 1900 SIG and converted MIMO 700 SIG, and an LO reference signal across the optical link 48a to the remote unit 112.

Figure 4B:
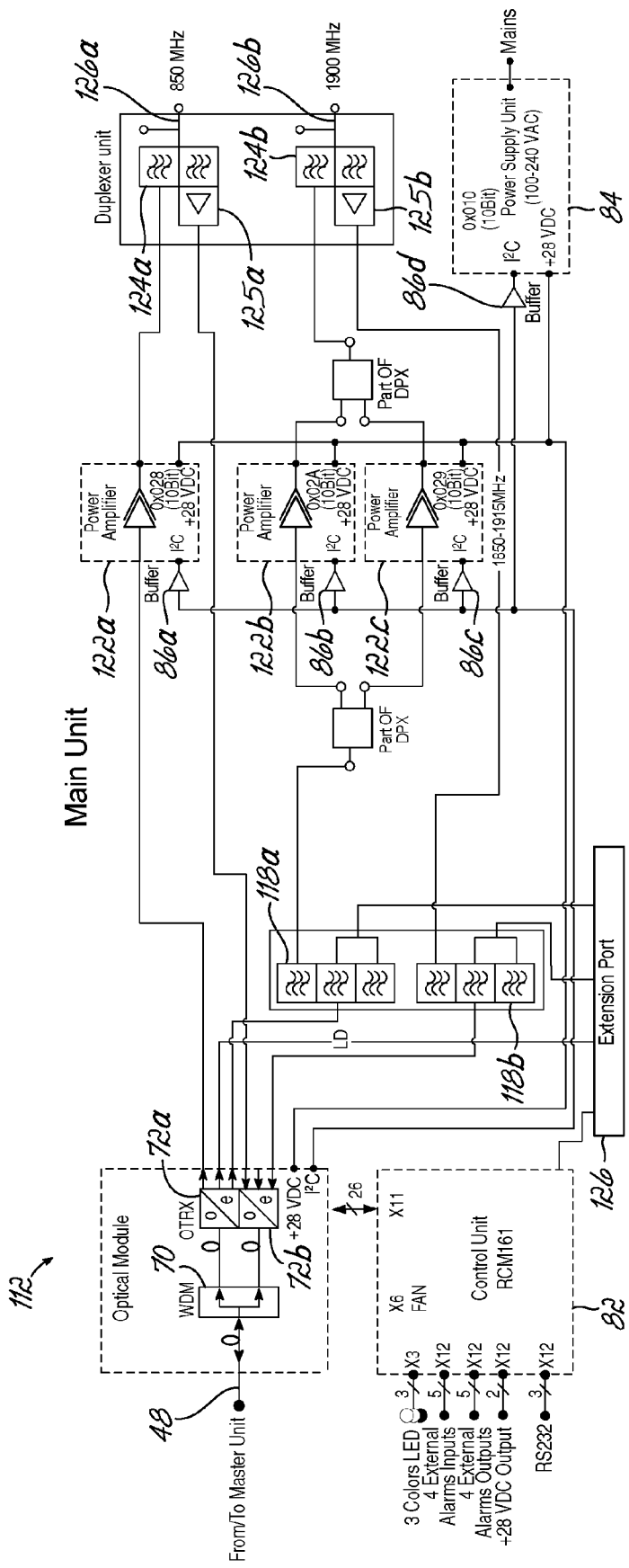
FIG. 4B is a block diagram of the remote unit of the MIMO DAS of FIG. 4A.

In the downlink direction and as illustrated in FIG. 4B, the remote unit 112 receives the combined signals and converts them from optical signals to a plurality of electrical signals. As such, the remote unit 112 includes wave division multiplexer 70 and the optical-to-electrical circuits 72a-b, as discussed above. In particular, the remote unit 112 provides the signal in the 850 MHz frequency service band along a different path than the signal that contains the combined 1900 MHz frequency band service signal and the converted 700 MHz frequency MIMO band signal. As shown in FIG. 4B, the 850 MHz signals are provided directly to an antenna port 126a through duplexer 124a. The combined 1900 MHz signals are provided to a duplexer 118a that splits the 1900 MHz frequency service band signals from the frequency converted 700 MHz frequency MIMO band signals. The 850 MHz frequency band signal and the 1900 MHz frequency band signal are then amplified by respective amplifiers 122 (122a, 122b, and 122c). In turn, the 850 MHz frequency band signals are duplexed by duplexer 124a and transmitted via a first antenna 44a that may be coupled to antenna port 126a. The 1900 MHz frequency band signals are duplexed by duplexer 124b and transmitted via a second antenna 44b that may be coupled to antenna port 126b. Therefore, the remote unit handles transceiving the 850 MHz and 1900 MHz signals. In the uplink direction, the 850 MHz frequency band signals and the 1900 MHz frequency band signals are amplified by respective amplifiers 125 (125a and 125b), such as LNA's. The amplified 850 MHz frequency band signals are then provided back to the electrical-to-optical circuit 72b while the amplified 1900 MHz frequency band signals are provided to the duplexer 118b for combination with any uplink frequency shifted 700 MHz frequency MIMO band signals.

Figure 4C:
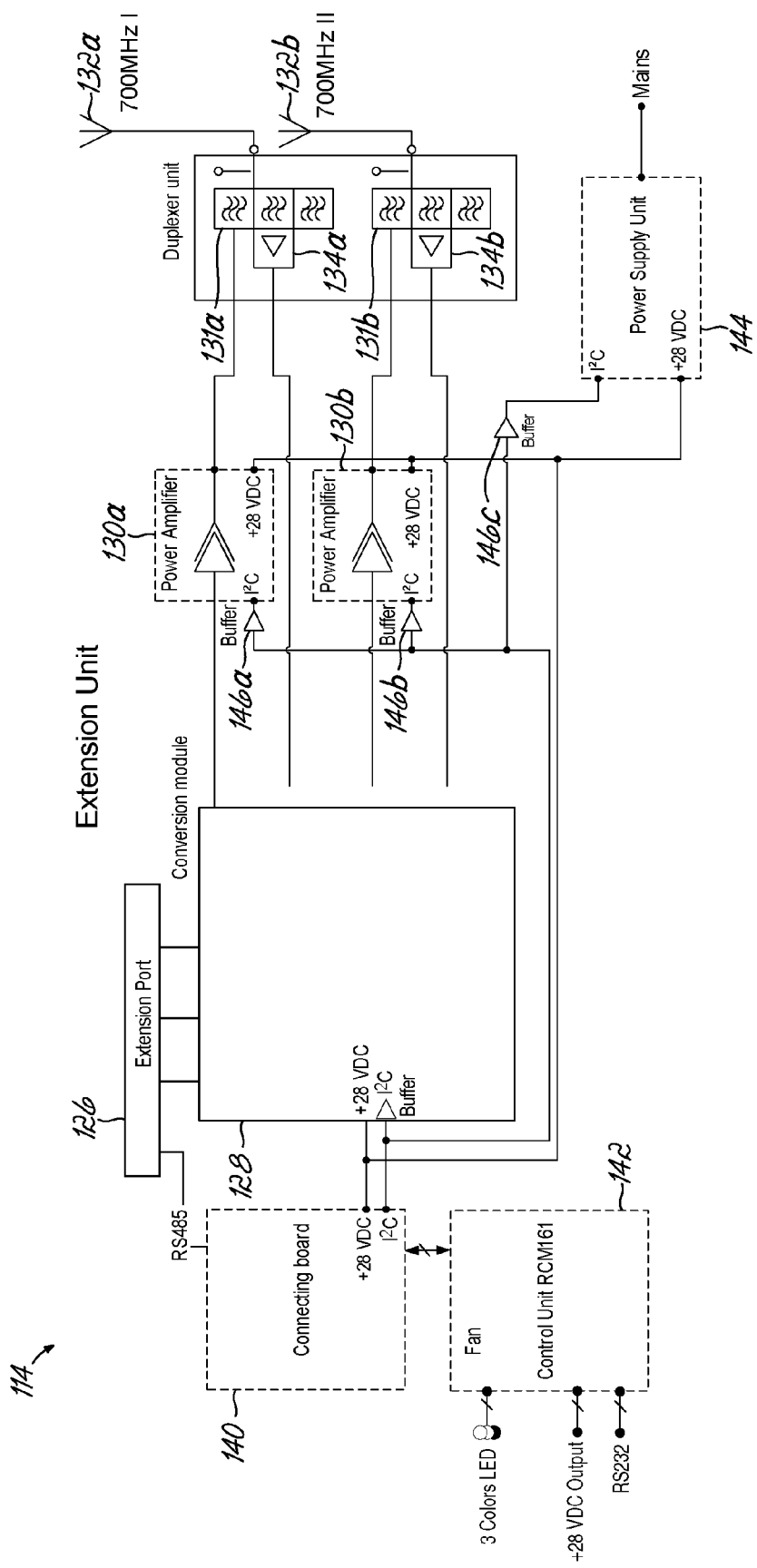
FIG. 4C is a block diagram of the extension unit of the MIMO DAS of FIG. 4A.

With respect to the frequency converted 700 MHz frequency MIMO band signals, they are provided, along with the LO reference, in the downlink direction, to an extension port 126 through duplexer 118a. The exterior port is connected to extension unit 114. FIG. 4C is an illustration of one embodiment of such an extension unit 114.

The extension unit 114 receives the converted 700 MHz frequency MIMO band signals, which are in the first or second frequency band FB1, FB2, and converts the signals back to the MIMO band for the air interface through the extension unit. Specifically, the extension unit converts the MIMO signals in a conversion module 128 to signals in the range of the original MIMO frequency and splits that signal. The split signals are amplified by respective power amplifiers 130 (130a and 130b) then output through respective duplexers 131 (131a and 131b) to respective antenna ports and antennas 132a and 132b. Thus, the MIMO DAS 110 transmits the signals in the 850 MHz band and the 1900 MHz band on respective antennas 44 of the remote unit 112, while transmitting the MIMO signals in the 700 MHz band on both antennas 132 of the extension unit 114.

In the uplink direction, the extension unit 114 provides MIMO signals that are received via antennas 132a and 132b in the original MIMO frequency through the respective duplexers 131a and 131b to be amplified by respective low noise amplifiers 134a and 134b. The MIMO signals are then converted into a seventh frequency band or sub-band FB7, or an eighth frequency band or sub-band FB8 in the extension unit 114 using frequency conversion module 128. This converted 700 MHz frequency band signal is, in turn, provided over the extension port 126 back to remote unit 112 to be forwarded to the master unit. In the illustrated embodiment, the MIMO signals are duplexed with the uplink 1900 MHz band frequency signal received by the remote unit and provided at duplexer 118b. The output of duplexer 118b is then processed by the electrical-to-optical circuit 72b for transmission over the optical link 48.

As illustrated in FIG. 4C, the extension unit 114 also includes a connecting board 140 that receives the RS485 signal from controller 82 of the remote unit 112 through the extension port 126. The extension unit 114 further includes a control unit 142 that controls the operation of the extension unit 114 and a power supply unit 144 that powers the extension unit 114. As illustrated in FIG. 4C, the extension unit 114 may include one or more buffers 146a-c.

As illustrated in FIGS. 4A-4C, the MIMO DAS 110 may have a downlink gain in the 700 MHz frequency band (whether a normal communication band or a MIMO specific communication band) of about 36 dB, whether that gain is measured using ICP3 optimized methods or NF optimized methods. Similar gains are illustrated in the 700 MHz frequency band and the 700 MHz MIMO specific communication band for ICP3 optimized measurements of uplink gain. However, the MIMO DAS 110 includes, for uplink gain measured using NF optimized methods, about 43 dB of gain for the 700 MHz frequency band and the 700 MHz MIMO specific communication band.

Thus, FIGS. 2A-2B, 3A-3B, and 4A-4C illustration various MIMO DAS's consistent with embodiments of the invention.

In disclosed embodiments, each frequency conversion module 52, 74, and/or 128 for the master, remote, and extension units, generally includes a downlink portion and an uplink portion for handling the signal traffic. FIG. 5A is one embodiment of a downlink portion 160 of a frequency conversion module 52/74/128 for a master unit 46 that may be used to frequency convert signals in the 700 MHz frequency band as well as to combine those converted signals with another service signal, such as a signal in the 1900 MHz frequency band. In particular, the downlink portion 160 receives the various service signals, as well as the MIMO signals, from an appropriate source, such as the BTS. The conversion module section 160 may attenuate any of the 850 MHz frequency band signals, the 1900 MHz frequency band signals, or the 700 MHz frequency MIMO band signals with respective attenuators 162 (162a, 162b, 162c, and 162d). Those signals might then be forwarded for further processing, such as amplification and/or frequency conversion, in accordance with the present invention. The downlink portion 160 provides frequency conversion by mixing with mixer 164a, the MIMO BTS SIG1with an LO having a first frequency LO1 signal generated by a suitable LO circuitry 176 to produce a first converted MIMO signal in the first frequency band FB1. The downlink portion 160 also mixes, with mixer 164b, the MIMO BTS SIG2with an LO signal at the second LO frequency LO2 (which is an integral multiple of the first LO signal frequency LO1) to produce another converted MIMO signal in the second frequency band FB2. These converted signals are then filtered further by respective filters 166 (166a and 166b), amplified by respective amplifiers 168 (168a and 168b), filtered further by respective filters 170 (170a and 170b), and amplified by respective amplifiers 172 (172a and 172b).

As illustrated in FIG. 5A, a frequency conversion module might also provide some combination of other service signals with the MIMO signals that have been frequency converted. Other service signals might pass directly from the master unit to the remote unit, without being significantly affected. For example, as shown in FIG. 5A, a service signal, such as a non-MIMO 800 MHz signal, might be forwarded directly through to a remote unit. Alternatively, a non-MIMO 1900 MHz signal might be combined or duplexed with the converted MIMO signals. As would be readily understood, the combination of such signals may depend upon the frequency conversion that takes places with respect to the MIMO signals and their frequency as presented onto the fiber link. In FIG. 5A, the 1900 MHz frequency band signal or other service is combined with the two converted MIMO signals by duplexer 174 to provide a combined MIMO signal to an optical-to-electrical circuit 50.

FIG. 5B is an illustration of an uplink portion 161 of a frequency conversion module 52 for a master unit 46 that may be used to split frequency converted MIMO signals in the 700 MHz frequency band from a non-converted service signal in the 1900 MHz frequency band, and to further convert the converted MIMO signals. Thus, the uplink portion 161 generally acts in the opposite manner of the downlink portion 160. For example, referring to FIG. 4B, the uplink signal from a remote unit may include frequency converted MIMO signals that are combined with a 1900 MHz signal. As such, the uplink portion 161 includes a duplexer 178 that splits the 1900 MHz frequency band signals from converted 700 MHz frequency MIMO band signals (e.g., one or more signals in the third, fourth, fifth, or sixth frequency bands/sub-bands FB3, FB4, FB5, FB6). The duplexer circuitry further splits a signal in the fifth or sixth frequency band/sub-band FB5, FB6 and the signal in the third or fourth frequency band/sub-band FB3, FB4 into two separate, frequency converted channels. The signals in the frequency converted channels are thus filtered by respective filters 180 (180a and 180b) and mixed by respective mixers 182 (182a and 182b). In particular, the signals in the fifth or sixth frequency band FB5, FB6 are mixed, by mixer 182a, with an LO signal at the first LO frequency LO1 to produce MIMO signals in desired MIMO uplink frequency bands. The signals in the third or fourth frequency band/sub-band FB3, FB4 are mixed, by mixer 182b, with the LO signal at the second LO frequency LO2 to also produce MIMO signals also in the desired MIMO uplink frequency bands. The MIMO signals in the 700 MHz frequency band in the two channels are then filtered by respective filters 184 (184a and 184b) and amplified by respective amplifiers 186 (186a and 186b), and/or then attenuated by respective attenuators 188 (188c and 188d) to output as MIMO signals BTS SIG1and BTS SIG2to transmit back to a BTS or other location. The 850 MHz frequency band signals and 1900 MHz frequency band signals are likewise attenuated by respective attenuators 188 (188a and 188b) as necessary.

FIG. 5C is an illustration of a downlink circuit portion 189a of a frequency conversion module 74, 128 that may be included in a remote unit 42, 102, and/or 112, or an extension unit 114. The downlink circuit portion 189a receives an LO reference signal (which is the LO signal at the first LO frequency LO1) from the master unit. The circuit also receives frequency converted MIMO signals, such as an converted 700 MHz frequency MIMO band signal, and duplexes the converted MIMO signals into two channels with a duplexer 190. The signals in each channel are then filtered with respective filters 191 (191a and 191b). In turn, the signal in one channel, which is in the first frequency band FB1, is mixed by mixer 192a with the LO signal at the first LO frequency LO1 to produce a first signal in the 700 MHz MIMO downlink frequency band. The signal in the other channel, which is in the second frequency band FB2, is mixed by mixer 192b with an LO signal at the second LO frequency LO2 (which is an integral multiple of the first LO frequency LO1) to produce a second signal in the 700 MHz MIMO downlink frequency band. The MIMO signals are then filtered via respective filters 193 (193a and 193b) and amplified by respective amplifiers 194 (194a and 194b) before being output from the conversion circuitry for eventual transmission.

Figure 5D:
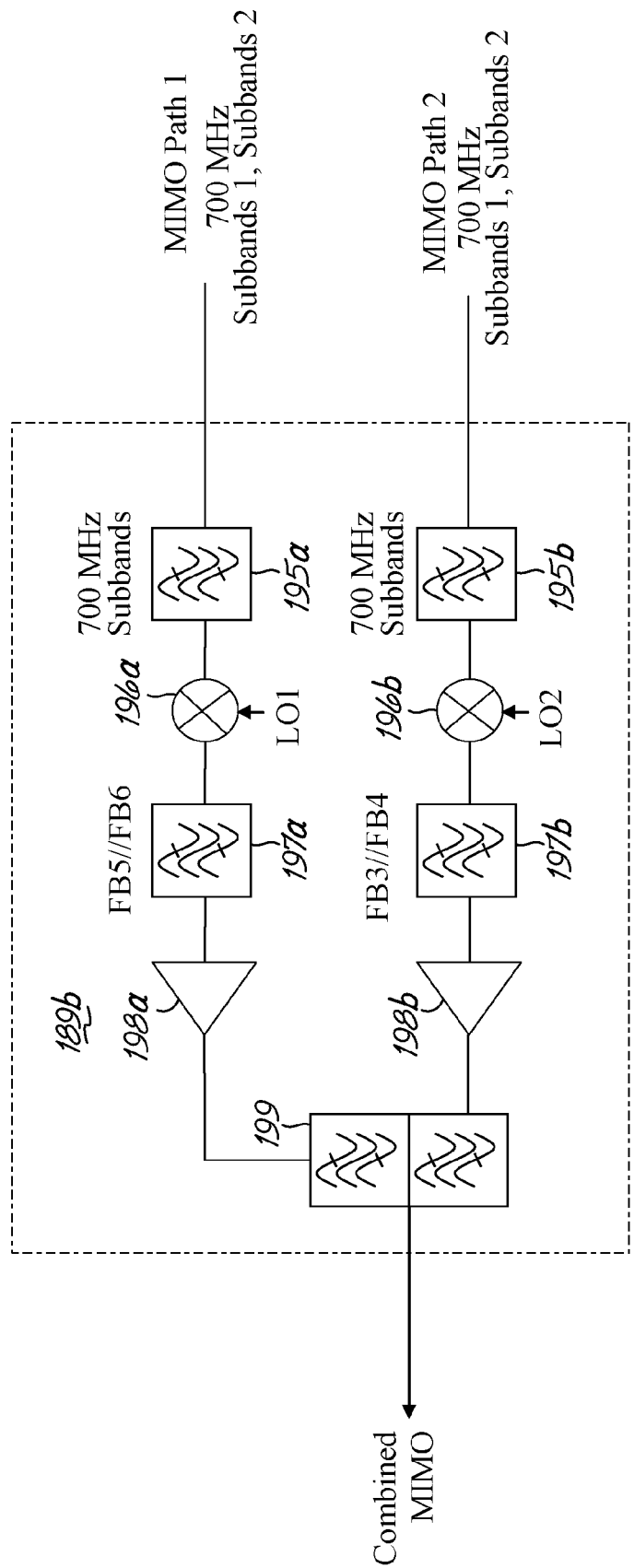
FIG. 5D is a diagrammatic illustration of an uplink portion of the conversion module in the remote unit and/or extension unit of the MIMO DAS of FIG. 2A, 3A, or 4A.

Similarly, FIG. 5D is an illustration of an uplink circuitry portion 189b of a frequency conversion module 74, 128 that may be included in a remote unit 42, 102, and/or 112, or an extension unit 114. Thus, the uplink portion 189b generally acts in an opposite manner to the downlink portion 189a. The uplink portion 189b includes two channels that each receives signals in the 700 MHz MIMO uplink frequency bands or sub-bands from suitable antennas and antenna ports. The signals in the channels are filtered by respective filters 195 (195a and 195b). In turn, the signal in one MIMO channel is mixed by mixer 196a with the LO signal at the first LO frequency LO1 to produce a first frequency converted uplink signal having a frequency in the fifth frequency band FB5 and the sixth frequency band FB6. The signal in the other MIMO channel is mixed by mixer 196b with a an LO signal at the second LO frequency LO2 (which is an integral multiple of the first LO signal at frequency LO1) to produce another converted uplink signal having a frequency in the third frequency band FB3 and the fourth frequency band FB4. The first and second converted signals are then filtered by respective filters 197 (197a and 197b), amplified by respective amplifiers 198 (198a and 198b), and combined by a suitable duplexer 199. The combined converted MIMO signal is then presented for transmission, in the uplink direction, over fiber link 48, back to the master unit.

In accordance with one aspect of the invention, as illustrated in FIGS. 2A-4C, the converted MIMO signals and other service signals are transmitted between the master unit and the various remote units and extension units implementing a single fiber that handles both the uplink signals and the downlink signals. Because of the frequency conversion provided for the various MIMO signals, the integrity of the MIMO process is maintained when the multiple MIMO signals originally having the same frequency are transmitted over a single cable, such as a single fiber-optic cable or link. In such a scenario, each of the individual MIMO signals is maintained at different frequencies in both the uplink direction and the downlink direction. That is, all the uplink MIMO signals have different frequencies, and all the downlink MIMO signals have different frequencies. Furthermore, to maintain the segregation between uplink and downlink signals over a single fiber-optic cable, all of the MIMO signals being transmitted in the downlink direction are at different frequencies from those that are being transmitted in the uplink direction.

In accordance with a further embodiment of the invention, the DAS system may incorporate separate cables, such as separate fiber-optic cables, between the master unit and any remote units or extension units. In such a case, the downlink signals are handled on a separate fiber-optic cable from the uplink signals.

Figure 6A:
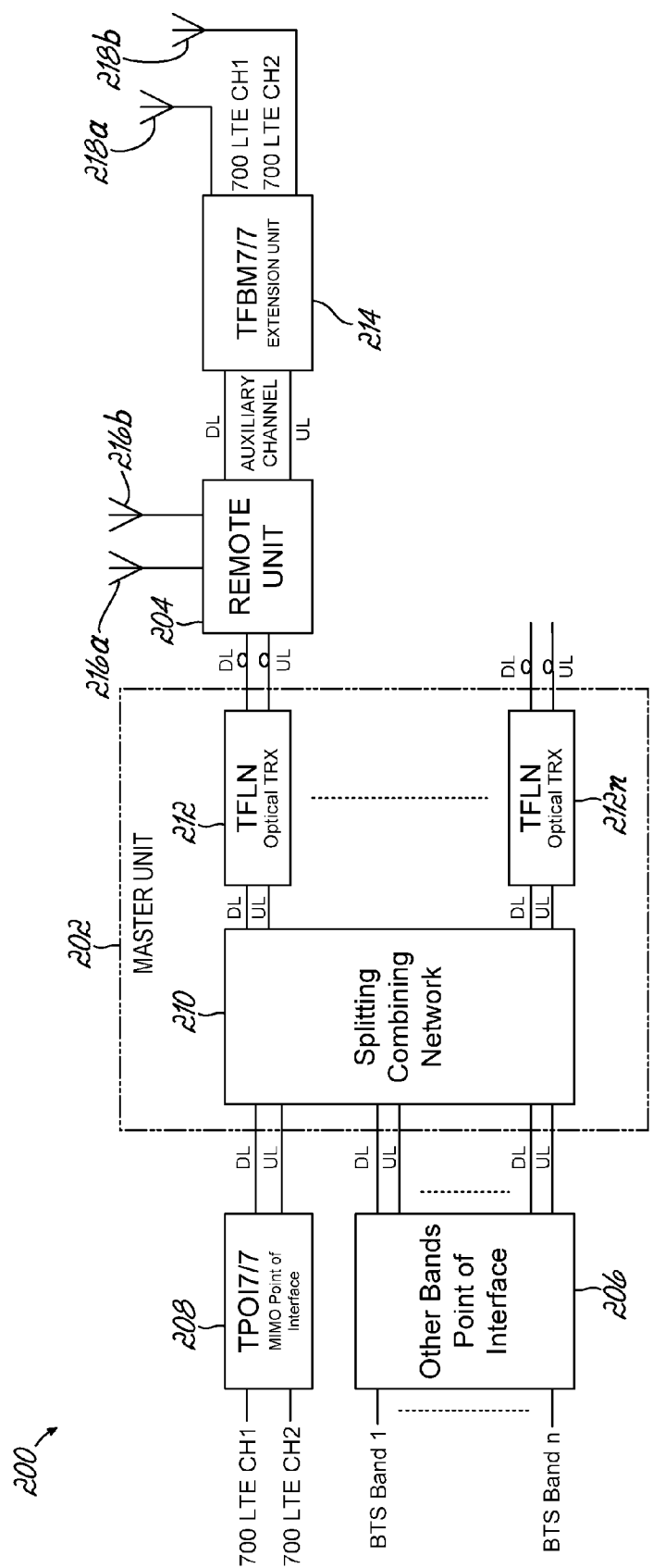
FIG. 6A is a block diagram of a legacy DAS converted to a MIMO DAS using a MIMO point of interface component as well as at least one extension unit consistent with embodiments of the invention.

FIG. 6A is a diagrammatic illustration of another embodiment of a MIMO DAS 200 that may be configured using a legacy DAS system, and in particular a legacy SISO DAS. Specifically, the MIMO DAS 200 includes a master unit 202. For example, the master unit might be an ION-B master unit, as distributed by Andrew LLC. The master unit is configured to provide signals to a plurality of remote units 204, such as ION-B remote units, which are also distributed by Andrew LLC. The present invention, therefore, might be used to provide a legacy system with MIMO capabilities. In a normal mode of operation, the master unit 202 is configured to send and receive signals from one or more plurality of BTSs, such as through a BTS point of interface component 206. Such BTS Bands 1-$n$ might be conventional, non-MIMO service bands, for example. To implement a MIMO operation, the master unit 202 is additionally configured to send and receive signals through a MIMO point of interface component 208. For purposes of illustration, the MIMO signals are illustrated as a MIMO signal in the 700 MHz frequency band (illustrated as "700 LTE CH1") and another, different MIMO signal in the 700 MHz frequency band (illustrated as "700 LTE CH2 ").

In the downlink direction, the BTS point of interface component 206 is configured to provide each of the BTS signals to a splitting/combining network 210 of the master unit 202 through a respective downlink connection, such as a coaxial cable. The MIMO point of interface component 208 is similarly configured to provide the plurality of MIMO signals in the 700 MHz frequency MIMO band to the splitting/combining network 210 through a corresponding downlink connection, such as a coaxial cable. In turn, the splitting/combining network 210 is configured to split and/or otherwise combine signals from the BTS point of interface component 206 and/or MIMO point of interface component 208 for transceiving with respective remote units 204. In operation, the splitting/combining network 210 is configured to provide the Band 1-$n$ service signals from at least one BTS, as well as the multiple MIMO signals in the 700 MHz frequency band, to optical transceiver circuitry 212 through a suitable downlink connection, such as a coaxial cable. The various optical transceiver circuits 212, in turn, provide downlink signals to respective remote units 204 through a downlink optical link, which may be an optical fiber. As is illustrated in FIG. 6A, the uplink (UL) and downlink (DL) paths are handled over separate fiber links.

Each remote unit 204 of the MIMO DAS 200 is configured to receive the optical signals from the master unit 202, convert those signals into appropriate electrical signals, transmit various of the signals for that remote unit 204 through one or more antennas 216a-b, and couple the plurality of MIMO signals in the 700 MHz MIMO frequency band to an extension unit 214 through downlink auxiliary channels for transmission on respective antennas 218a-b thereby.

In the uplink direction, the extension unit 214 receives uplink MIMO signals in the 700 MHz frequency band or other MIMO frequency band on respective antennas 218a-b and provides those signals to the remote unit 204 over the auxiliary channels or ports. The remote unit 204, in turn, receives other service signals via the antennas 216a-b and combines those signals with the MIMO signals from the extension unit 214. The remote unit provides them via an uplink optical link, which may be an optical fiber, to the optical transceiver 212 of the master unit 202 after appropriate conversion from electrical signals, such as using suitable optical transceiver circuitry, as noted below. The optical transceiver 212, in turn, provides the combined signals to the splitting/combining network 210 through an uplink connection, which may be a coaxial cable. The splitting combining network 210 splits the combined signals back to the MIMO point of interface 208 through an uplink connection, which may be a coaxial cable, as well as the signals for the respective BTS bands 1-n for transmission back to that BTS through the BTS point of interface component 206.

Thus, the MIMO DAS 200 operates to simultaneously transmit the signal from at least one BTS through the remote unit 204 as well as a plurality of MIMO signals in the 700 MHz frequency band or other MIMO band through the extension unit 214 using a legacy DAS communication system and additional components.

Figure 6B:
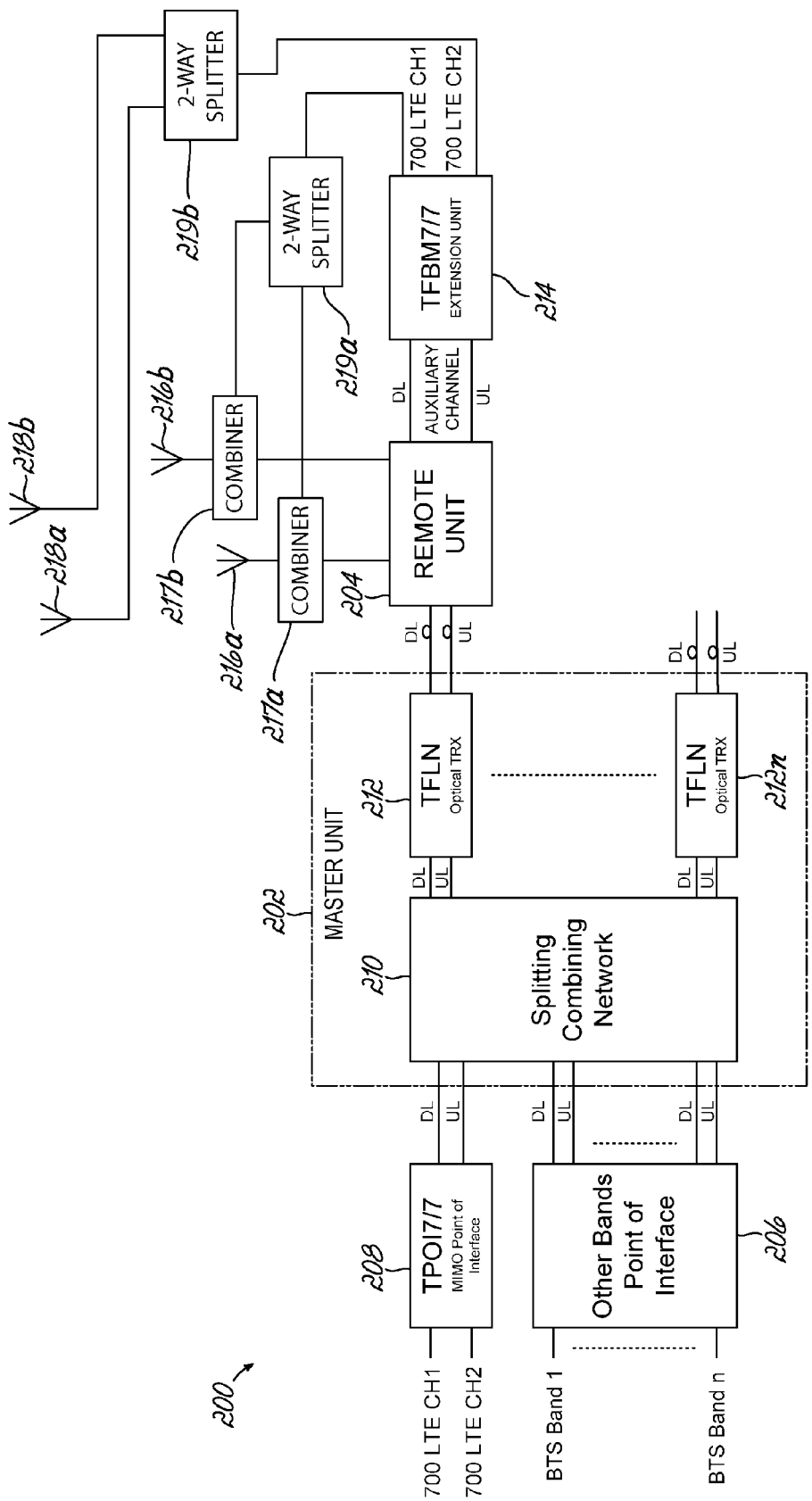
FIG. 6B is a block diagram of the converted MIMO DAS system in FIG. 6A with the addition of 2-way splitters and combiners configured so that the legacy signals share antennas with at least some of the MIMO signals consistent with embodiments of the invention.

In accordance with the aspects of the invention, the DAS 200 as illustrated in FIGS. 6A-6B also provides frequency translation or frequency conversion of a plurality of MIMO signals for maintaining the integrity of the MIMO system. All of the MIMO signals, including any additional service signals, are sent over dual fiber-optic cables. One fiber link is for the uplink signals and another fiber link is for the downlink signals. As illustrated in the FIGS. 6A, 6B, and 7A, although the downlink and uplink paths are handled over separate fiber-optic cables, all the MIMO signals in the downlink direction, as well as all of the MIMO signals in the uplink direction, are present on the same fiber-optic cable. As such, the present invention addresses the integrity of the MIMO process by providing suitable frequency conversion and frequency translation of the MIMO signals discussed herein.

Figure 7A:
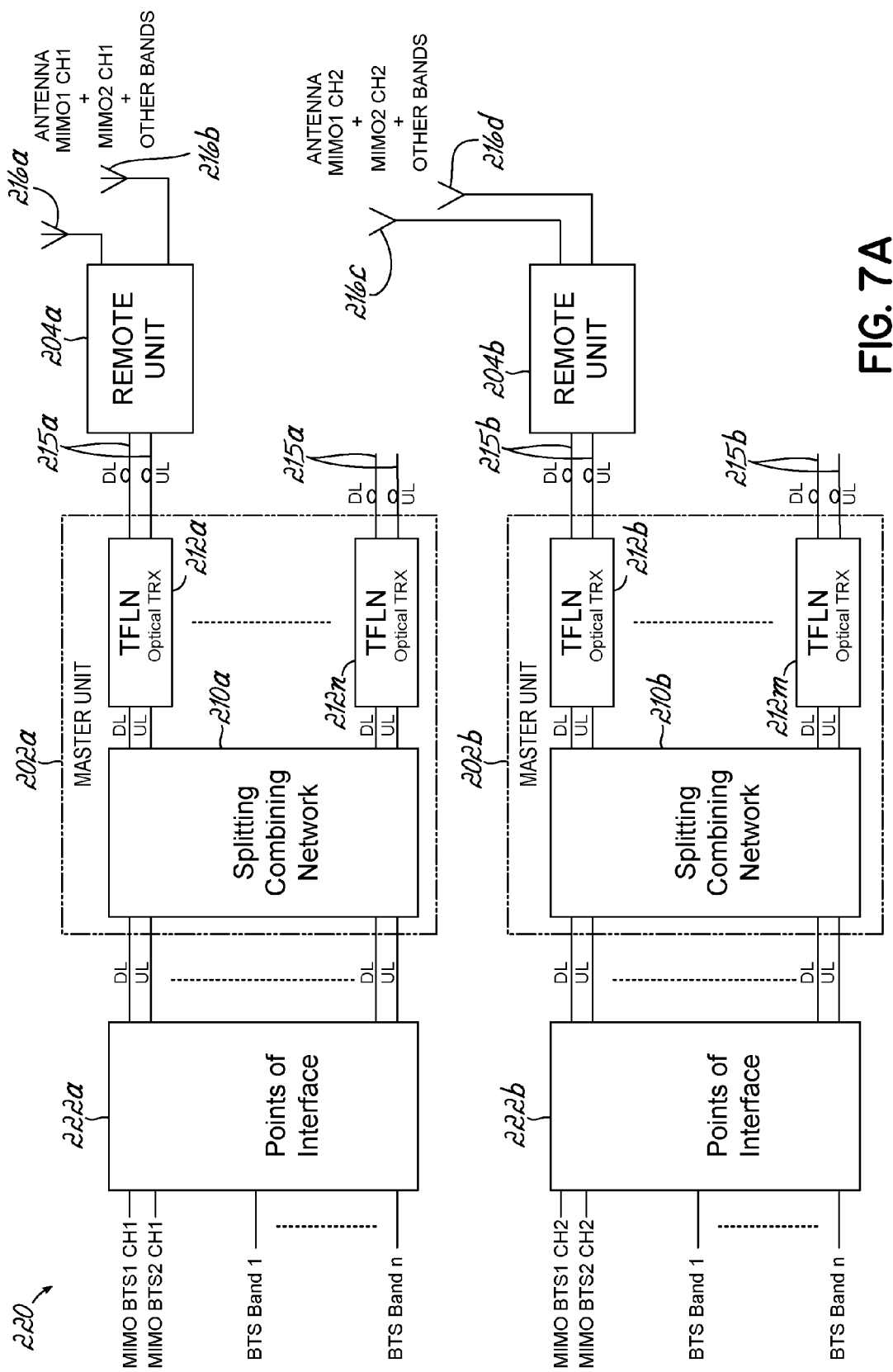
FIG. 7A is a block diagram of a legacy DAS converted to a MIMO DAS by introducing additional signals consistent with embodiments of the invention.

FIG. 6B is a diagrammatic illustration of another embodiment of the MIMO DAS 200 somewhat similar to the DAS system of FIG. 6A, except in which the signals from the remote unit 204 and the extension unit 214 are combined prior to being transmitted via the appropriate antennas 216a-b and/or 218a-b. The extension unit 214 processes the various MIMO signals, however, antennas from the remote units 204 are used for transceiving the MIMO signals, in addition to antennas coupled to the extension unit 214. As such, a combiner 217a and 217b is placed between the remote unit 204 and the respective antennas 216a and 216b of the remote unit. The combiners 217a and 217b, in turn, receive signals from a splitter 219a that is coupled with the extension unit 214. The other splitter 219b is placed between the extension unit 214 and respective antennas 218a and 218b. A first output of splitter 219a is provided to a first antenna 216a of the remote unit 204, while a second output of the splitter 219a is provided to the second antenna 216b of the remote unit 204. As for splitter 219b, a first output is provided to the first antenna 218a of the extension unit 214, while a second output is provided to the second antenna 218b of the extension unit 214. In this manner, the MIMO DAS 200 operates to simultaneously transmit the signals from at least one BTS service band, and one of the signals in the 700 MHz MIMO frequency band through a first antenna 216a of the remote unit 204, simultaneously transmit the signals from at least one BTS service band and one of the signals in the 700 MHz frequency band through a second antenna 216b of the remote unit 204, and simultaneously transmit another signal in the 700 MHz MIMO frequency band through the antennas 218a and 218b of the extension unit 214. As such, the MIMO transmission is shared between the remote unit and extension unit FIG. 7A is a diagrammatic illustration of another alternative embodiment of a MIMO DAS 220 that may be configured from a pre-existing SISO DAS, and in particular a DAS that does not use an extension unit for handling the MIMO signals. As such, the MIMO DAS 220 includes at least one master unit 202a-b for each of the multiple MIMO signals in the 700 MHz frequency band. Specifically, the MIMO DAS 220 includes a point of interface component 222a-b for each master unit 202a-b that combines multiple MIMO signals in the 700 MHz frequency band (e.g., illustrated as "MIMO BTS1 CH1," "MIMO BTS2 CH1," "MIMO BTS1CH2 ," and "MIMO BTS2 CH2 ") with one or more other service signals from a plurality of BTSs.

In the downlink direction, for example, the point of interface component 222a combines a signal from a first MIMO BTS in a MIMO band, such as the 700 MHz frequency band, (e.g., MIMO BTS1CH1) with a signal from a second MIMO BTS in a MIMO band, such as the 700 MHz frequency band (e.g., MIMO BTS2 CH1) and at least one service signal from at least one additional BTS. This combined signal is provided to the master unit 202a via a downlink connection, such as a coaxial cable. The master unit 202a, in turn, provides the combined signals, through the optical transceiver circuitry 212a, to remote units 204a over a set of uplink and downlink fiber cables for transmission by antennas 216a-b. Therefore, the remote units 204a handle one MIMO signal for the various MIMO bands MIMO BTS1and MIMO BTS 2.

Similarly, the point of interface component 222b combines a signal from the first MIMO BTS in a MIMO band, such as the 700 MHz frequency band, (e.g., MIMO BTS1 CH2 ) with a signal from the second MIMO BTS in a MIMO band, such as the 700 MHz frequency band, (e.g., MIMO BTS2 CH2 ) and at least one service signal from at least one additional BTS. This combined signal is provided to the master unit 202b via a downlink connection, such as a coaxial cable, which in turn provides the combined signals to another set of remote units 204b over a separate set of uplink and downlink fiber cables for transmission by its antennas 216c-d. Therefore, the remote units 204b handle an additional MIMO signal for the various MIMO bands MIMO BTS1 and MIMO BTS2.

In that way, the segregation between various MIMO signals is maintained by implementing various master units and associated remote units, each handling a specific MIMO signal. In that way, the plurality of MIMO signals might be transmitted throughout a space, such as the inside of a building or other confined area where the DAS system might be utilized in accordance with the principles of the invention. Master unit 202a incorporates a set of downlink and uplink fiber-optic cables 215a for handling one of the MIMO signals for each of the various different MIMO services. Alternatively, the master unit 202b handles another of the MIMO signals of the various different MIMO services. As such, in accordance with one aspect of the invention, the segregation of the different MIMO signals, CH1 and CH2 , for example, are maintained without requiring frequency conversion or frequency translation, as is utilized in various of the other embodiments of the invention disclosed herein.

Figure 7B:
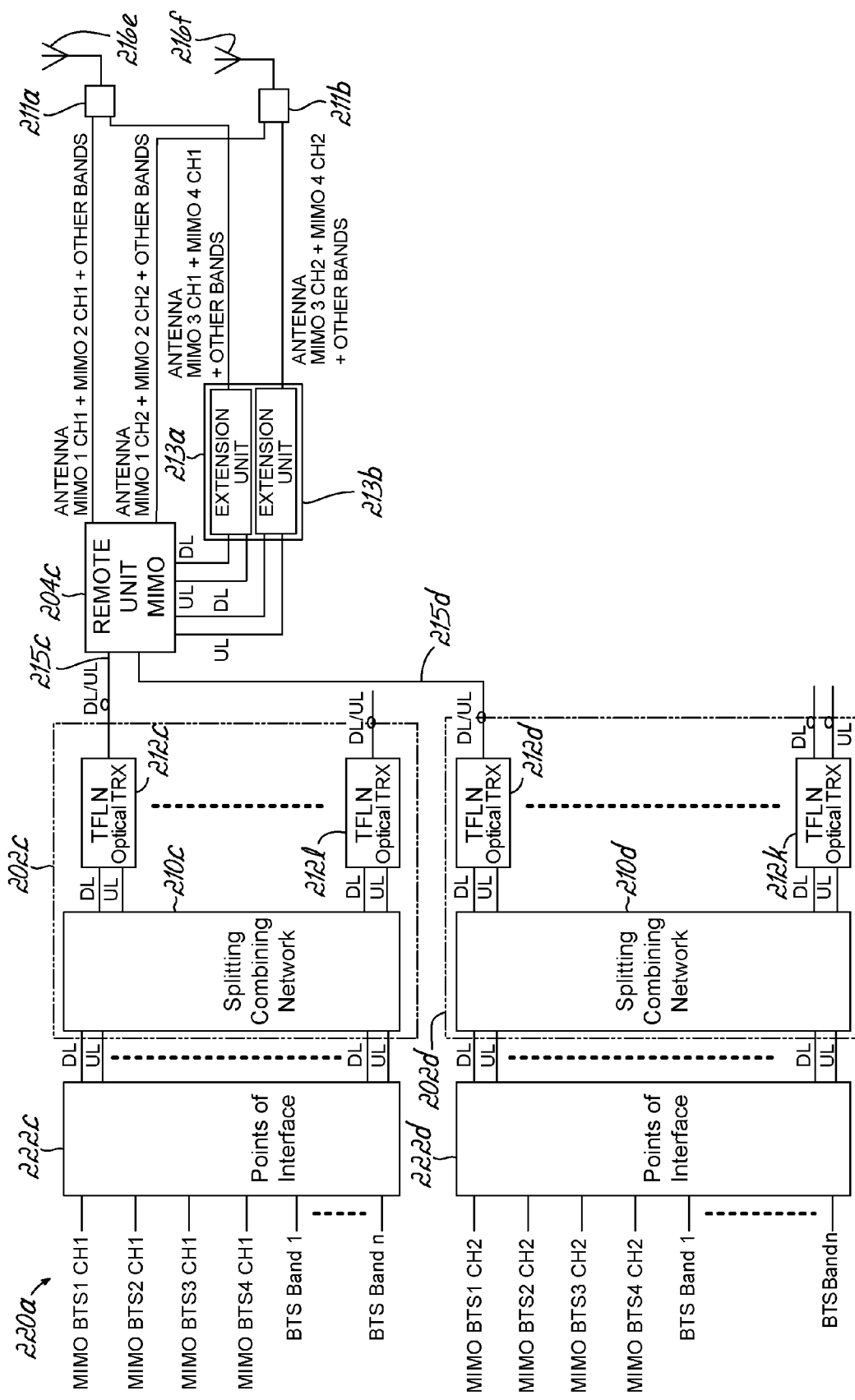
FIG. 7B is a block diagram of an alternative embodiment of a DAS system capable of handling MIMO signals.

FIG. 7B is a diagrammatic illustration of another alternative embodiment of a MIMO DAS 220a that may be configured from a pre-existing SISO DAS. The MIMO DAS 220a includes one or more extension units for handling additional MIMO signals, thereby allowing a single remote unit to accommodate more than two MIMO BTSs. In contrast to the system illustrated in FIG. 7A, which provides an optical link between a master unit and remote unit with separate uplink and downlink cables, the system in FIG. 7B is configured so that the uplink and downlink optical signals between a master unit and remote unit share a single fiber. Advantageously, this configuration may allow a legacy SISO system that uses separate fibers for uplink and downlink signals (such as those illustrated in FIGS. 6A and 6B) to handle additional MIMO signal bands, as compared to the system illustrated in FIG. 7A. The additional MIMO signals may be coupled to extension units through extension ports on a single remote unit 204c for transmission to existing antennas. The MIMO DAS 220a may thereby provide MIMO signals to the service area without the need for frequency conversion or additional optical fibers with respect to an existing legacy system having separate uplink and downlink fiber cables.

To this end, the MIMO DAS 220a includes separate master units 202c-d for each of the multiple MIMO signals in the 700 MHz frequency band. Specifically, the MIMO DAS 220a includes point of interface components 222c-d for each of the separate master units 202c-d. The point of interface components 222c-d are coupled to appropriate sources of communication signals, such as one or more BTSs, and combine multiple MIMO signals in the 700 MHz frequency band (e.g., illustrated as "MIMO BTS1 CH1," "MIMO BTS2 CH1," "MIMO BTS3 CH1," "MIMO BTS4 CH1," "MIMO BTS1 CH2 ," "MIMO BTS2 CH2 ," "MIMO BTS3 CH2 ," and "MIMO BTS4 CH2 ") with one or more other service signals (BTS Band 1-n) from one or more BTSs.

In the downlink direction, for example, the point of interface component 222c combines signals from four MIMO BTSs in chosen MIMO bands, such as the 700 MHz frequency band and other bands (e.g., MIMO BTS1 CH1, MIMO BTS2 CH1, MIMO BTS3 CH1, and MIMO BTS4 CH1), with at least one service signal from at least one additional BTS (BTS Band). This combined signal is provided to the master unit 202c via a downlink connection, such as a coaxial cable. The master unit 202c, in turn, provides the combined signals, through the optical transceiver circuitry 212c, to a remote unit 204c over a single fiber cable 215c for transmission by antennas 216e-f. To reduce the total number of fiber cables required, the downlink signal shares the fiber cable 215c with its associated uplink signal. To this end, the uplink and downlink signals are multiplexed in optical units at either end of the fiber using appropriate combining or multiplexing circuitry, such as illustrated in FIGS. 2B, 3B, and 4B.

Similarly, the point of interface component 222d combines signals from the four MIMO BTSs in a MIMO band, such as the 700 MHz frequency band, (e.g., MIMO BTS1 CH2 , MIMO BTS2 CH2 , MIMO BTS3 CH2 , and MIMO BTS4CH2 ) with at least one service signal from at least one additional BTS. This combined signal is provided to the master unit 202d via a downlink connection, such as a coaxial cable, which in turn provides the combined signals to remote unit 204c over a separate fiber cable 215d for transmission by antennas 216c-d. Therefore, the MIMO DAS 202a handles the additional MIMO signals or Channel 2 signals for the various MIMO bands MIMO BTS1, MIMO BTS2, MIMO BTS3, and MIMO BTS 4 by utilizing a second fiber (which may have served as an uplink fiber in the legacy SISO system) to deliver MIMO CH2 signals from the plurality of BTSs. The remote unit 204c receives the various different MIMO signals and processes and directs those signals appropriately for the interface. Because the Channel 1 and Channel 2 MIMO signals are handled over separate fiber links, the MIMO information on those channels remains intact without frequency translation and segregation. The remote unit 204c communicates MIMO BTS1 CH1 and CH2 ; and MIMO BTS2 CH1 and CH2 , and other appropriate signal bands over antennas 216e and 216f.

The additional MIMO signals in the downlink direction originating from the third and fourth MIMO BTSs in the MIMO band (e.g., MIMO BTS3 CH1, MIMO BTS4 CH1, MIMO BTS3 CH2 , MIMO BTS4 CH2 ) are received by the remote unit 204c and communicated through extension or auxiliary ports to extension units 213a-b for transmission by antennas 216e, 216f. To accommodate these additional MIMO signals, the remote unit 204c may include one or more extension ports each configured to accept connections from an extension unit 213a-b. When the extension units 213a-b are coupled to the remote unit 204c via the extension ports, additional separate uplink and downlink paths are provided through the remote unit 204c to the various extension units. The multiple extension units might be configured to handle separate MIMO channels, as shown for the MIMO 3 and MIMO 4 bands. For example, extension unit 213a handles Channel 1 signals for the additional bands, and extension unit 213b handles Channel 2 signals.

Segregation between various MIMO signals is thereby maintained by implementing various master units and associated extension units coupled by a single remote unit. The remote unit handles transmission of the MIMO signals from the first and second MIMO BTSs, and the extension units each handle specific MIMO channel signals from the third and fourth MIMO BTS's. Each of the MIMO antennas 216e, f are coupled with the remote unit and extension units to handle the Channel 1 and Channel 2 signals respectively for multiple MIMO services. In that way, the plurality of MIMO signals may be transmitted throughout a space, such as the inside of a building or other confined area where the DAS system may be utilized in accordance with the principles of the invention. Master unit 202c utilizes one fiber-optic cable 215c for handling the uplink and downlink signals for one of the MIMO channel signals for each of the various different MIMO services; and master unit 202d utilizes a second fiber-optic cable 215d for handling the other of the MIMO channel signals. Additional master units may be added as required to handle additional MIMO BTSs, with corresponding extension units 213a-b coupling the additional MIMO signals to the antennas 216e-f through signal combiners 211a-b. As such, in accordance with one aspect of the invention, the segregation of the different MIMO signals, CH1, CH2 for example, is maintained without requiring frequency conversion or frequency translation, as is utilized in various of the other embodiments of the invention disclosed herein.

Figure 8:
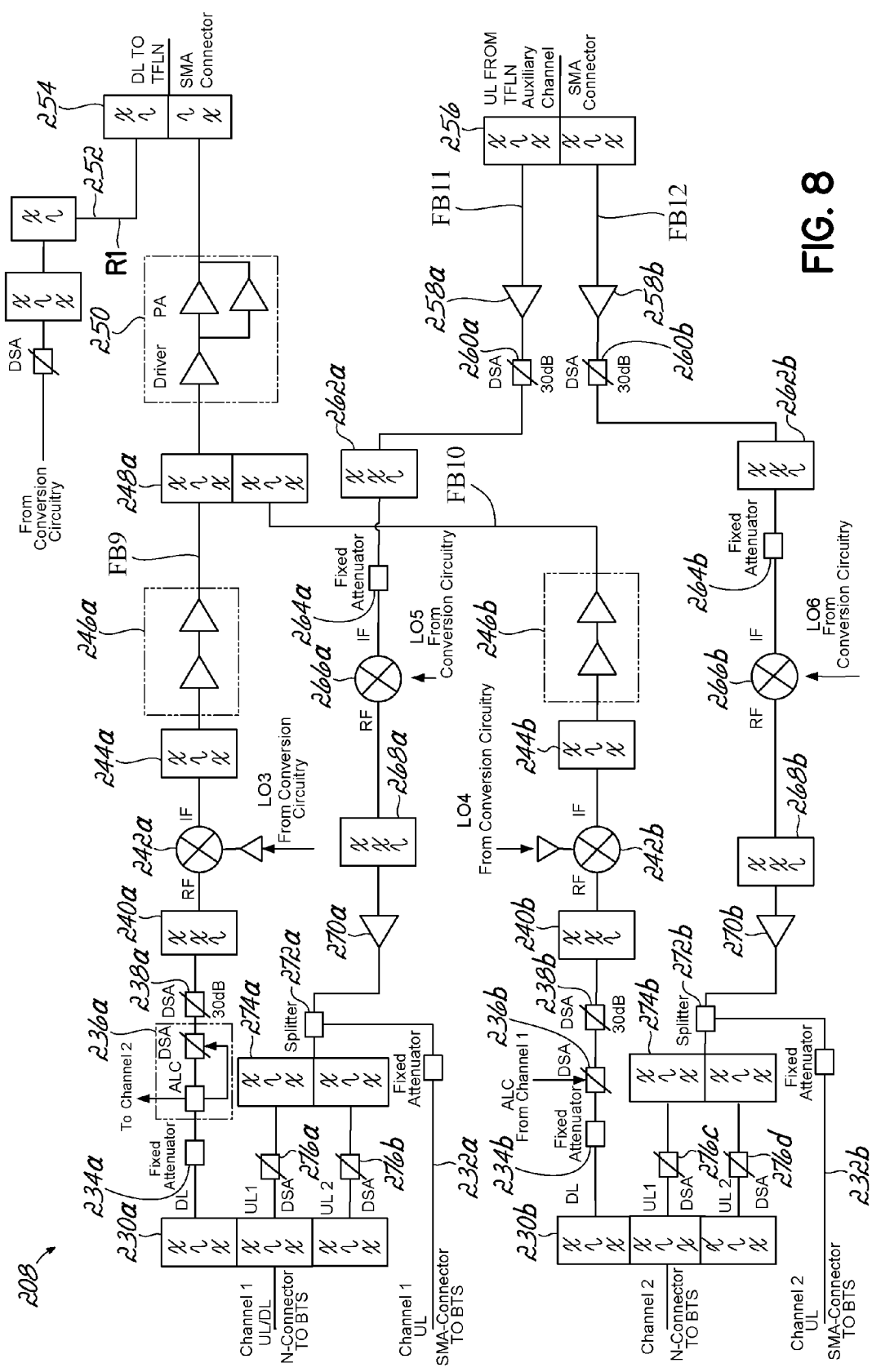
FIG. 8 is a block diagram of the MIMO point of interface component of FIGS. 6A-6B.

FIG. 8 is a diagrammatic illustration of at least a portion of the MIMO point of interface component 208 that may be used within the MIMO DAS 200 of FIGS. 6A, 6B. Returning to FIG. 8, the MIMO point of interface component 208 processes the various MIMO signals in the MIMO band, such as a 700 MHz frequency band, in much the same way, apart from the frequencies to which they are converted/translated and combined in the end.

More specifically, the MIMO point of interface is coupled with the master unit in DAS 200 such that the interface circuit 208 handles the frequency conversion or translation rather than the master unit, and thus delivers the frequency converted MIMO signals to the master unit to then be forwarded to the various remote units. For the purposes of discussion, the different MIMO signals will be referred to as Channel 1 or CH1 and Channel 2 or CH2 . As discussed above, while a 2×2 MIMO arrangement is disclosed and discussed herein, additional MIMO arrangements might be utilized, and therefore, there may be additional MIMO signals such as CH3, CH4, etc. In accordance with the invention, those signals would have to be handled in a similar fashion to provide the desirable frequency conversion and/or separate handling of the various MIMO channel signals to maintain the integrity of the MIMO process.

As such, the MIMO point of interface component 208 is configured to accept both duplexed or un-duplexed signals. In the case of duplexed signals, the signals are processed through a respective duplexer circuitry, such as triplexers 230 (230a and 230b) that separate the downlink MIMO signals from uplink MIMO signal sub-bands. When the signals are not duplexed, the downlink (DL) signal is processed through a respective triplexer 230 with the uplink (UL) signal sub-bands connected to a respective separate connector 232 (232a and 232b).

With respect to the downlink path, the MIMO channel signals are attenuated by a fixed amount with an attenuator 234 (234a, 234b) then processed through two digital attenuators 236 (236a, 236b) and 238 (238a, 238b), one of which 236 is responsible for automatic level control ("ALC") and the other of which 238 is used to adjust the gain (e.g., in the 30 dB range, in 1 dB steps). A filter 240 (240a and 240b) filters the respective channel signals. The signals are then mixed with an appropriate LO reference in a respective mixer 242 (242a and 242b) to produce respective frequency converted signals. As illustrated in FIG. 8, the signal of the first MIMO channel CH1 is mixed by mixer 242a with an LO reference at a third LO frequency LO3. The signal of the second MIMO channel CH2 is mixed by mixer 242b with an LO reference at a fourth LO frequency LO4. As such, in the embodiment of FIG. 8, the MIMO signals CH1, CH2 are converted into a ninth frequency band FB9 (CH1) and a tenth frequency band FB10 (CH2 ). The frequency converted signals are filtered again with a respective filter 244 (244a and 244b), and amplified by respective amplification circuits 246 (246a and 246b). After amplification, the two downlink signals CH1 and CH2 are combined in a duplexer 248a. The combined signal is then further amplified by amplifier circuit 250 before being combined with another attenuated and filtered frequency reference as at 252 by duplexer 254. The MIMO point of interface component 208 then provides the combined signals to the master unit 202 as described above.

In the uplink (UL) direction, the MIMO uplink signals from the master unit 202 are split appropriately into two signals by a duplexer 256. For example, the MIMO signals from the various remote units might be in an eleventh frequency band FB11 and a twelfth frequency band FB12. As noted above, the MIMO uplink signals may be in various sub-bands of FB11, FB12. Each signal is then filtered by a respective filter 258 (258a and 258b), attenuated by a respective attenuator 260 (260a and 260b), filtered again by respective filter 262 (262a and 262b), and again attenuated by respective attenuator 264 (264a and 264b). Each signal is then frequency converted by a respective mixer 266 (266a and 266b). In particular, the signal on the first channel is mixed by mixer 266a with an LO reference at a fifth LO frequency LO5, while the signal on the second channel is mixed by a mixer 266b with an LO reference at a sixth LO frequency LO6. This yields MIMO uplink signals in the original MIMO uplink band. In any event, the frequency converted signals are filtered by a respective filter 268 (268a and 268b), and amplified by a respective amplifier 270 (270a and 270b) prior to being provided back to a MIMO BTS as described above.

In particular, the signals in the uplink direction are split by respective splitter 272 (272a and 272b) and duplexed into respective MIMO uplink sub-bands by respective duplexer 274 (274a and 274b). Each sub-band is attenuated by respective attenuator 276 (276a-276b) then combined with the downlink signals by the respective duplexer circuits 230. Alternatively, the signals in the uplink direction are provided directly back to the respective MIMO BTSs via the respective connectors 232.

Figure 9:
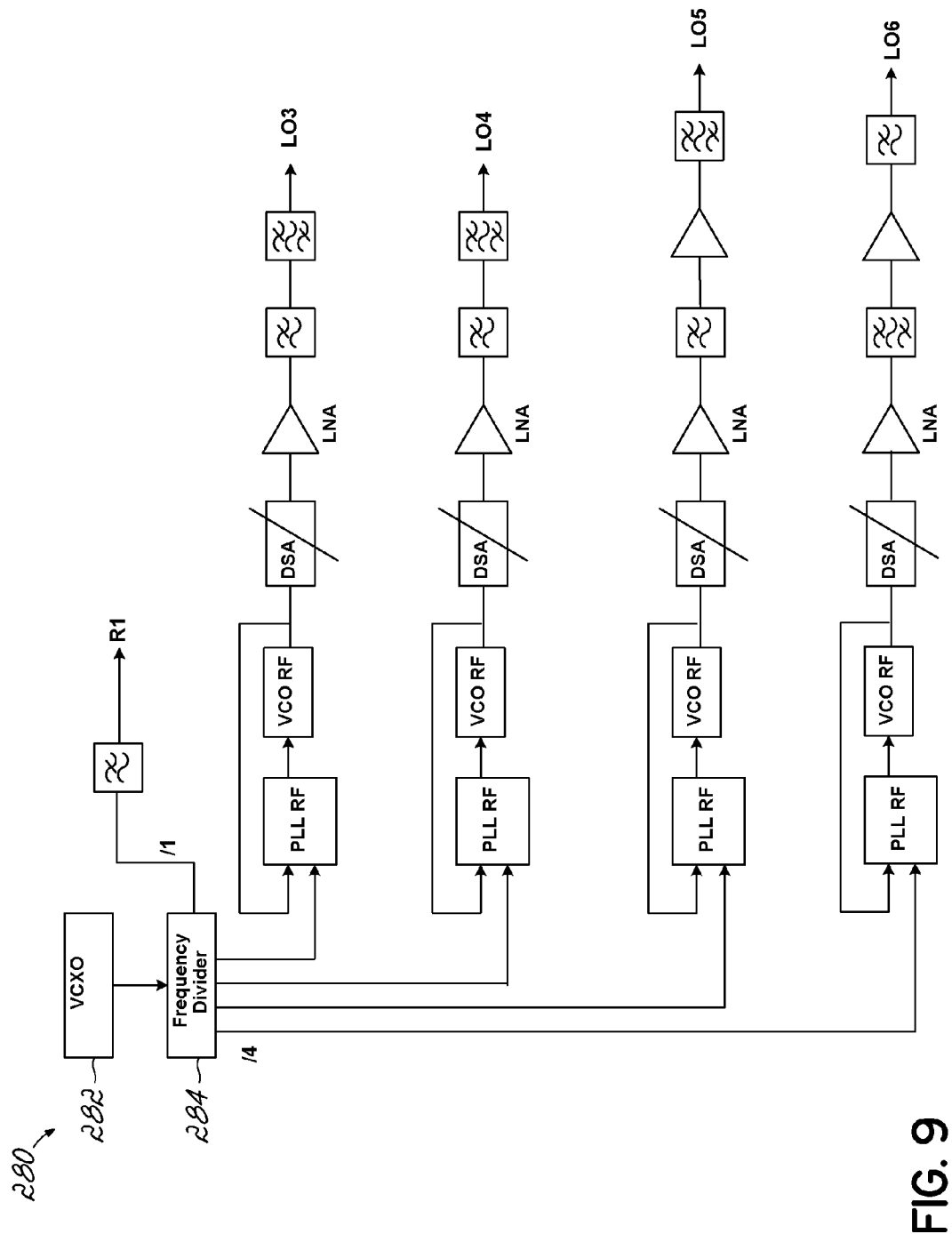
FIG. 9 is a block diagram of frequency conversion circuitry that may be used in the MIMO point of interface component of FIG. 8.

FIG. 9 is a diagrammatic illustration of frequency conversion circuitry 280 that may be used inside the MIMO point of interface component 208 for providing desirable LO's or other frequency references for frequency conversion. A voltage controlled crystal oscillator 282 provides a reference frequency signal, such as a signal at a first reference frequency R1. A frequency divider 284 produces stabilized reference signals that are subsequently filtered. The frequency divider 284 further divides the reference frequency signal into additional paths to generate the reference signals for the synthesizers of the LO references for the MIMO point of interface component 208. The reference signals are level adjusted, amplified, and/or filtered, as necessary. In specific embodiments, the frequency conversion circuitry 280 produces a frequency reference at frequency R1 and LO references at frequencies LO3, LO4, LO5, and LO6.

Figure 10:
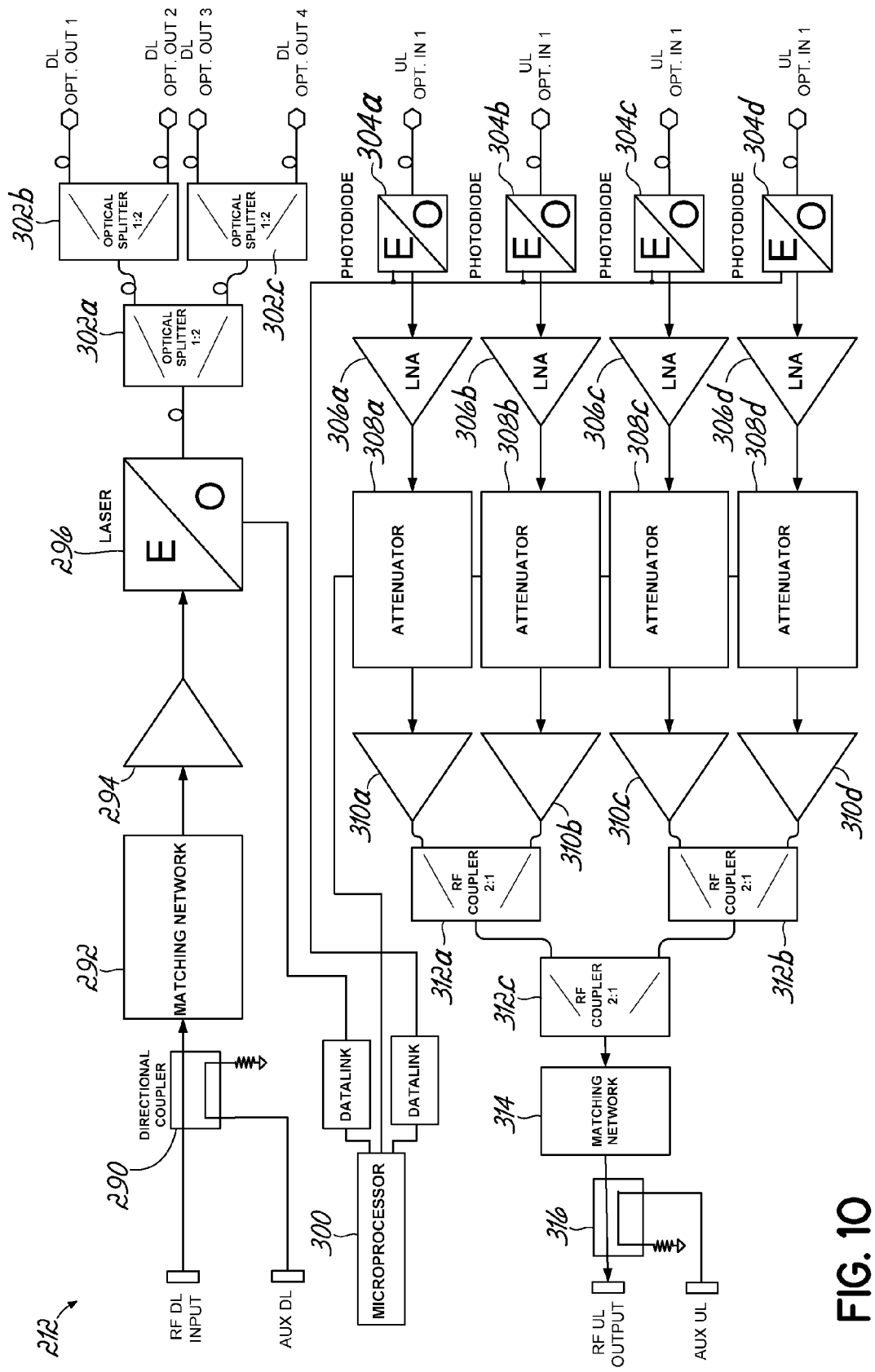
FIG. 10 is a block diagram of an optical transceiver that may be used in the MIMO DAS of FIG. 6A, 6B, 7A, or 7B.

FIG. 10 is a diagrammatic illustration of at least a portion of optical transceiver circuitry 212 that may be used with the MIMO DAS 200 of FIGS. 6A, 6B, or the MIMO DAS 220 of FIG. 7A, or 7B. Returning to FIG. 10, the optical transceiver circuitry 212 includes main channel and auxiliary downlink inputs, as well as main channel and auxiliary uplink inputs. In the downlink direction, the signal received on the main channel downlink input is combined with any signal received on the auxiliary downlink input in a directional coupler 290, processed through a matching network 292, amplified in amplifier 294, and converted to an optical signal by an electrical-to-optical circuit 296. The optical signal may then be split by a series of optical splitters 302a-c to output various outputs, such as to one of four optical outputs. The outputs include the signals combined from the main channel and auxiliary downlink inputs. The downlink signals are provided by appropriate downlink optical links, such as fiber-optic cables, to remote units 204. As illustrated in FIG. 10, the optical transceiver 212 may include a microprocessor 300 to control its operation.

In the uplink direction, signals received from the remote units 204 on suitable optical links, such as fiber-optic cables, provide various (e.g., one of four) inputs that are converted from an optical signal to an electrical signal by a respective electrical-to-optical circuit 304 (304a-d). The signals are amplified by a respective amplifier 306 (306a-d), and attenuated by a respective attenuator 308 (308a-d). The signals are then amplified by another respective amplifier 310 (310a-d). Each of the uplink signals received is then combined by a series of RF couplers 312a-c, processed through a matching network 314, and split between the corresponding main channel and auxiliary uplink inputs for transmission to the splitting/combining network 210 of the master unit.

Figure 11:
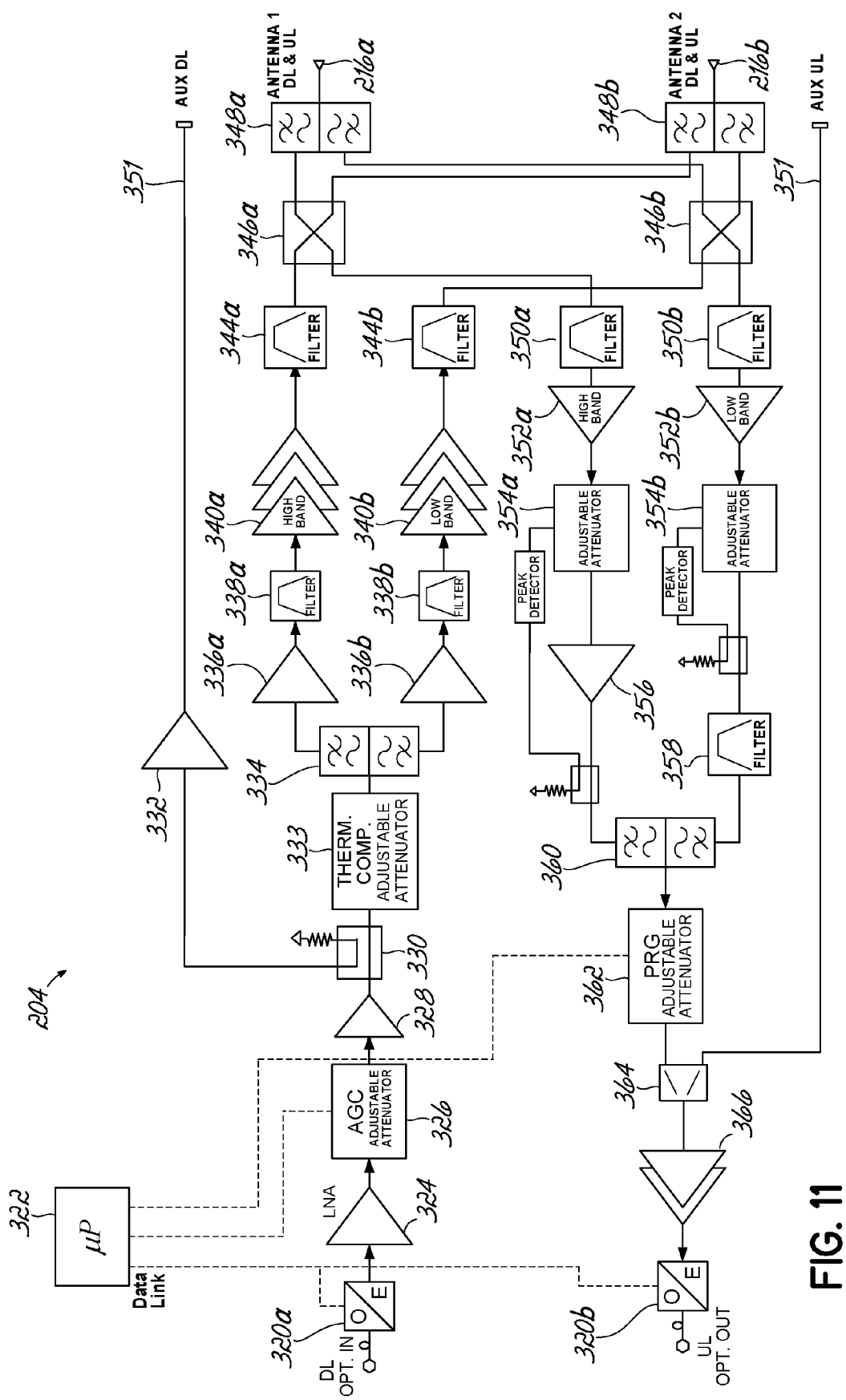
FIG. 11 is a block diagram of a remote unit that may be used in the MIMO DAS of FIG. 6A, 6B, 7A, or 7B.

FIG. 11 is a diagrammatic illustration of at least a portion of a remote unit 204 that may be used with the MIMO DAS 200 of FIGS. 6A-6B, or the MIMO DAS 220 of FIGS. 7A-7B. The remote unit 204 couples with a master unit over multiple fiber-optic cables, one dedicated for the uplink traffic, and another for the downlink traffic. In the downlink direction, the remote unit 204 receives an optical signal across a downlink optical connection and converts that signal to an electrical signal using an electrical-to-optical circuit 320a under control of a suitable microprocessor 322. The electrical signal is then amplified by an amplifier 324 and attenuated by an adjustable automatic gain control attenuator 326 also under control of the microprocessor 322. The attenuated signal is again amplified by an amplifier 328. In accordance with one aspect of the invention, the signal is split into separate signals for the remote unit 204 and for an extension unit 214 using a directional coupler 330.

The directional coupler 330 separates the main signal for the remote unit 204 to include an auxiliary signal for provision to an auxiliary signal port 351 in the remote unit. An extension unit 214 is coupled to the auxiliary port 351. Thus, the auxiliary signal is amplified by an amplifier 332 then provided to extension unit 214. The main signal, in turn, is attenuated by an adjustable attenuator 333, which may compensate for temperature variances, and duplexed by a duplexer 334 into its high frequency and low frequency band components, such as a signal in the 1900 MHz frequency band (e.g., a "high" band) and a signal in the 850 MHz frequency band (e.g., a "low" band). The high and low band signals are amplified by respective amplifiers 336 (336a and 336b), filtered by respective filters 338 (338a and 338b), and again amplified by respective high or low band amplifiers 340 (high band amplifier 340a and low band amplifier 340b). The high and low band signals are then filtered via a respective filter 344 (344a and 344b), and coupled to each antenna 216a-b via a respective coupler 346 (346a and 346b). The high and low band signals combined by respective duplexers 348 (348a and 348b) for transmission on a plurality of antennas 216a-b of that remote unit 204. Thus, the remote unit 204 simultaneously provides the high and low band signals for each antenna 216a-b.

In the uplink direction, the signals from the antennas 216a-b are separated by the duplexers 348a-b and couplers 346a-b into their respective high and low band signals. Each of the high and low band uplink signals is then filtered by a respective filter 350 (350a and 350b), amplified by a respective amplifier 352 (high band amplifier 352a and low band amplifier 352b), and attenuated by a respective adjustable attenuator 354 (354a and 354b), which may adjust the gain of the respective band. The high band signal is then amplified by an amplifier 356 while the low band signal is filtered by a filter 358. The high and low band signals are then combined into a common uplink signal via a duplexer 360. The uplink signal is attenuated by a programmable and adjustable attenuator 362 that is controlled by the microprocessor 322. The signals handled by the remote unit are then combined with any auxiliary signals from the extension unit 214 by a combiner 364. The combined uplink and auxiliary signal is then amplified by an amplifier 366 before being converted into an optical signal by an electrical-to-optical circuit 320b for being directed to a master unit over the fiber link.

As discussed above with respect to FIGS. 6A and 6B, for implementing a MIMO service within an existing DAS system, an extension unit might utilized and coupled with the remote unit for handing one or more of the plurality of MIMO signals. Such an extension unit is coupled with the remote unit, such as through an auxiliary port that has individual uplink and downlink connections, as illustrated. Such a connection might be made using a suitable link, such as a coaxial cable link.

Figure 12:
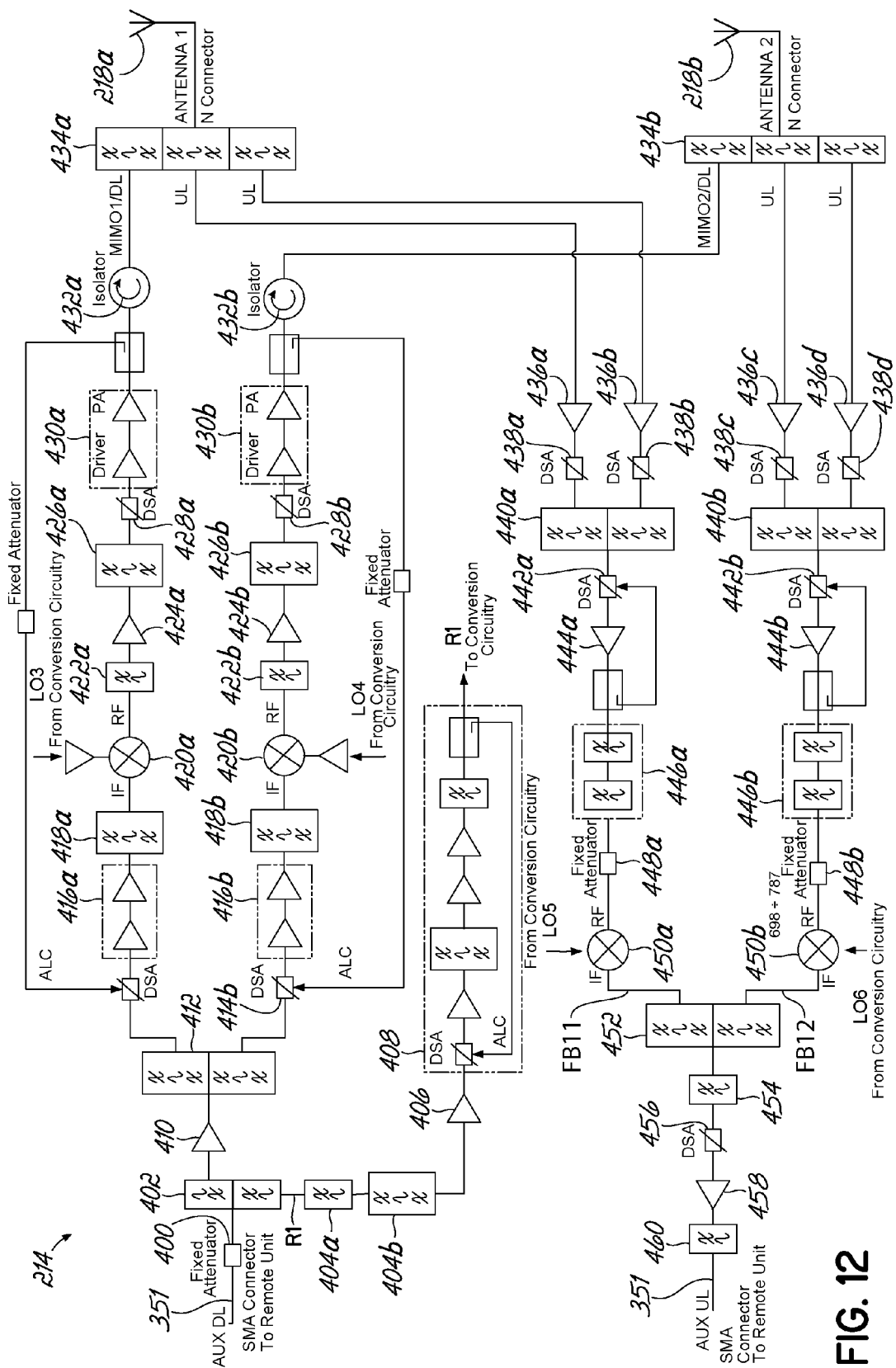
FIG. 12 is a block diagram of an extension unit that may be used in the MIMO DAS of FIG. 6A, 6B, 7A, or 7B.

FIG. 12 is a diagrammatic illustration of an extension unit 214 that may be used with the MIMO DAS 200 of FIGS. 6A-6B, or the MIMO DAS 220 of FIGS. 7A-7B. In FIG. 12, the downlink signal coming into the extension unit 214 is attenuated by attenuator 400 and duplexed by duplexer 402 to separate the main signal from any frequency reference that might be utilized for the frequency conversion of the MIMO signals. The frequency reference is then filtered by filters 404a-b, amplified by amplifier 406, and level controlled through an automatic level control circuit 408 prior to use for signal frequency conversion.

The downlink signal, however, is amplified by amplifier 410 then duplexed by duplexer 412 into the multiple MIMO signals, such as the two MIMO signals corresponding to those provided to the MIMO point of interface component 208 and/or point of interface component 222. Each signal is level adjusted via another respective automatic level control component 414 (414a and 414b), amplified by a respective amplification circuit 416 (416a and 416b), filtered by a respective filter 418 (418a and 418b), and frequency converted with a respective active mixer 420 (420a and 420b). In particular, the signal on the first channel (e.g., the signal in the ninth frequency band FB9) is mixed by active mixer 420a with an LO reference at the third LO frequency LO3 and frequency converted to a range of the MIMO downlink band. The signal on the second channel (e.g., the signal the tenth frequency band FB10) is mixed by active mixer 420b with an LO reference at the fourth LO frequency LO4, and frequency converted to the MIMO downlink band. Each frequency converted signal is then filtered by a respective filters 422 (422a and 422b), amplified by a respective amplifier 424 (424a and 424b), filtered by another respective filter 426 (426a and 426b), attenuated by a respective attenuator 428 (428a and 428b), and amplified by a respective amplification circuit 430 (430a and 430b) before being isolated via a respective isolator 432 (432a and 432b) and duplexed with uplink signals via a respective duplexer 434 (434a and 434b). The isolators 432a-b provide adequate matching between the output of each amplification circuit 430a-b and the antennas 218a-b.

The MIMO signals might then be directed to appropriate antennas for providing an air interface for the signals. As illustrated in the embodiment of FIG. 6A, the extension unit 214 might handle the MIMO signals exclusively with the antennas coupled to the extension unit. Alternatively, as illustrated in FIG. 6B, MIMO signals might be directed from the extension unit to other antennas, such an antennas coupled to the remote unit 204. In accordance with MIMO principles, it is desirable to transmit the MIMO downlink signals over separate antennas to provide the advantages of a MIMO scheme.

In the uplink direction, each signal received from the antennas 218a-b is separated into uplink bands or sub-bands by the respective duplexers 434a-b. Each sub-band is amplified by a respective amplifier 436 (436a-d) and attenuated by a respective attenuator 438 (438a-d). The uplink sub-bands from the first antenna 218a are combined by duplexer 440a, while the uplink sub-bands from the second antenna are combined by duplexer 440b. The respective combined uplink signals then have their levels adjusted via a respective level control component 442 (442a and 442b) and are amplified by a respective amplifier 444 (444a and 444b), filtered by a respective filter circuit 446 (446a and 446b), and attenuated by a respective attenuator 448 (448a and 448b). The combined signals are then frequency converted by a respective mixer 450 (450a and 450b). In particular, the signal on the first channel is mixed by active mixer 450a with an LO reference at the fifth LO frequency LO5 and frequency converted to the eleventh frequency band FB11, while the signal on the second channel is mixed by active mixer 450b with an LO reference of at the sixth LO frequency LO6, and thereby frequency converted into the twelfth frequency band FB12. The frequency converted signals are then duplexed together by duplexer 452. The duplexed signal is then filtered by filter 454, attenuated by attenuator 456, amplified by amplifier 458, attenuated by attenuator 460, and provided to a respective remote unit 204 over an auxiliary uplink (UL) path in an auxiliary port.

Figure 13:
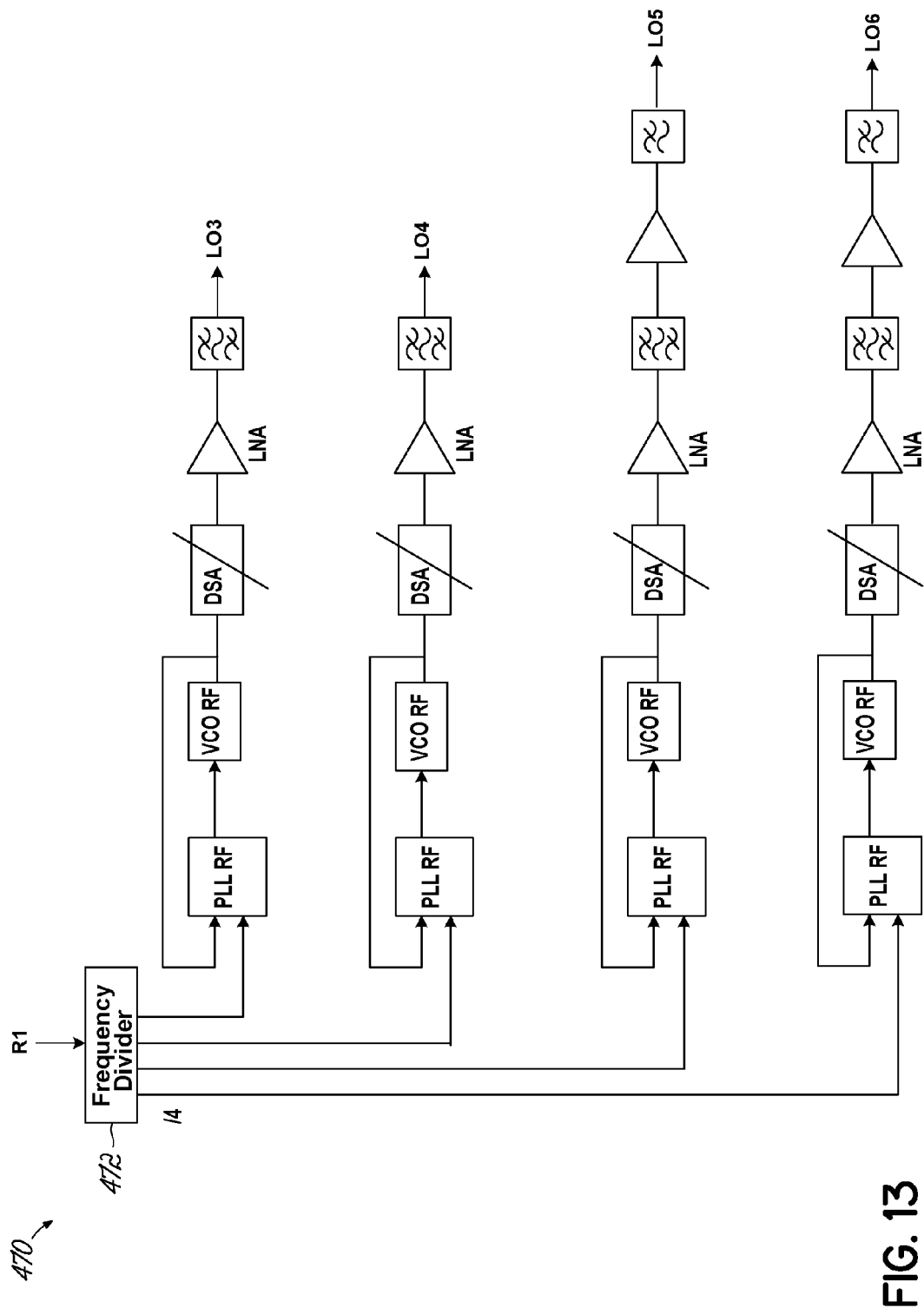
FIG. 13 is a block diagram of frequency conversion circuitry that may be used in the extension unit of FIG. 12.

FIG. 13 is a diagrammatic illustration of frequency conversion circuitry 470 that may be used with the extension unit 214. In particular, a frequency reference filtered from the downlink path (e.g., a frequency reference having a frequency of R1) is provided to a frequency divider 472 which divides the frequency reference by four to generate the references for the synthesizers of the LO references for the extension unit 214, each of which is level adjusted, amplified, and/or filtered, as necessary. In specific embodiments, the frequency conversion circuitry 470 produces reference signals of LO3, LO4, LO5, and LO6.

Figure 14:
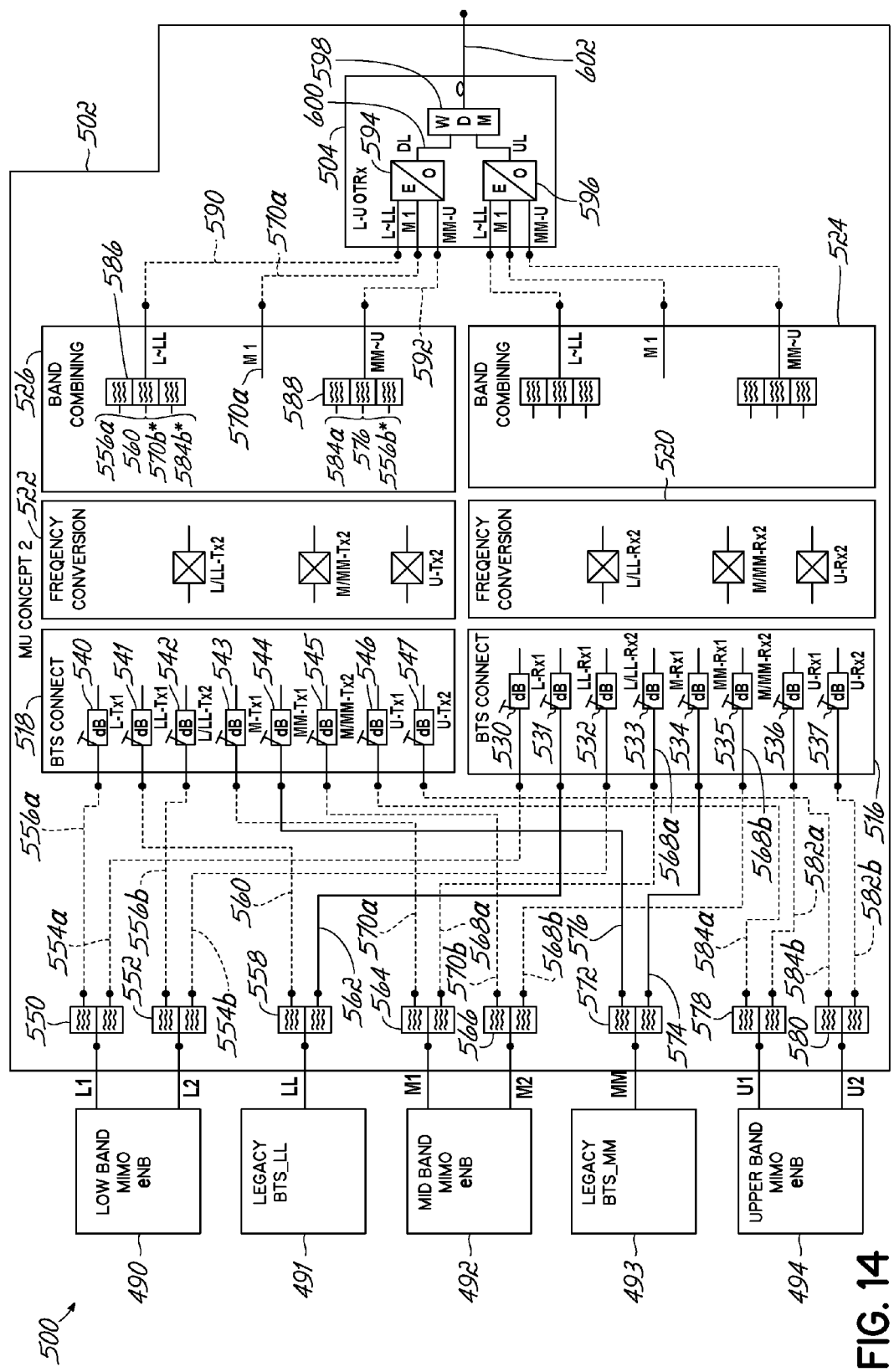
FIG. 14 is a block diagram of a DAS system and master unit in accordance with an alternative embodiment of the invention.
Figure 15:
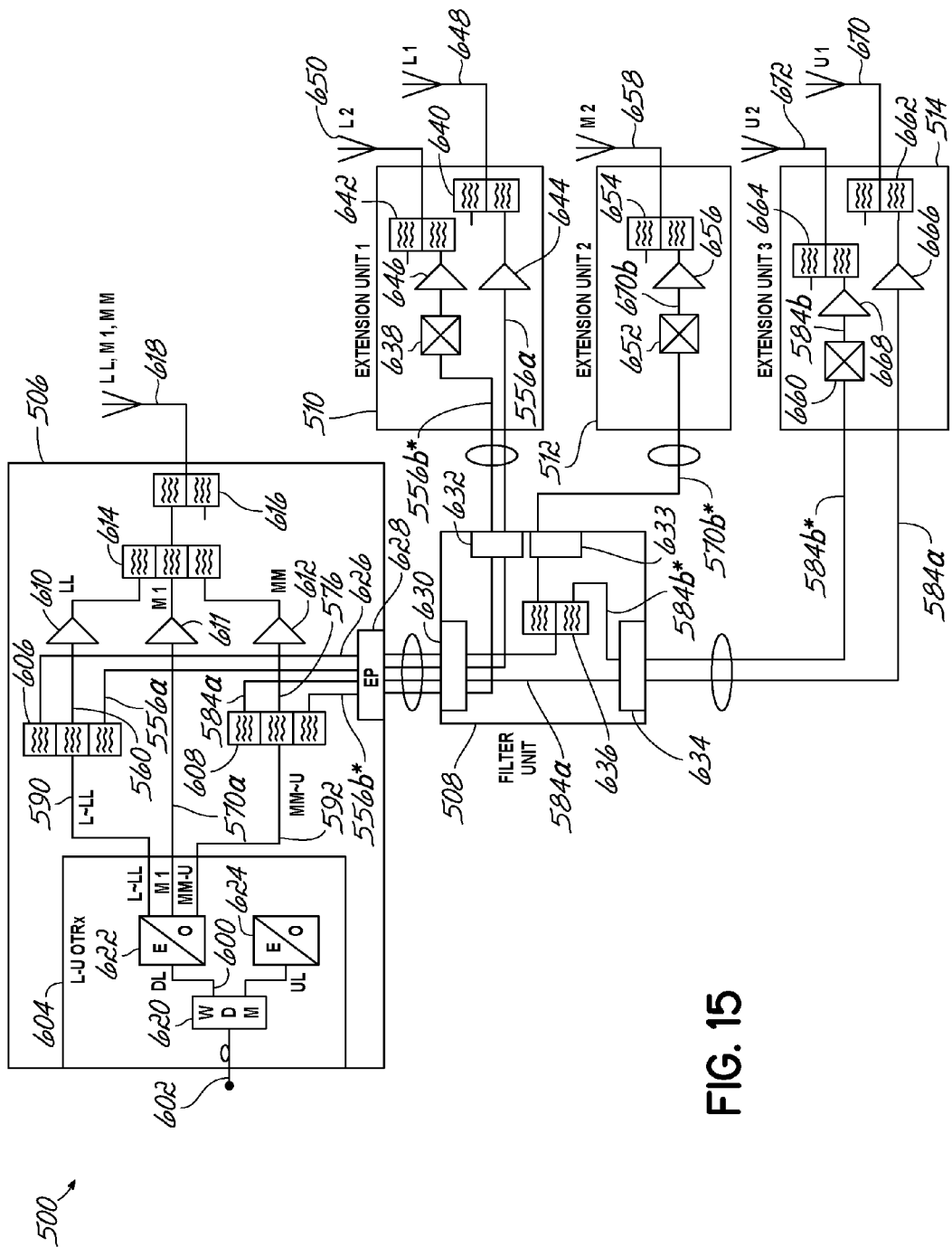
FIG. 15 is a block diagram of the DAS system of FIG. 14 illustrating the DL path of a remote unit and extension units for such a system.

FIGS. 14-15 together present an exemplary embodiment of the distributed antenna system (DAS) 500 that provides broadband coverage to an extended service area. The DAS 500 is configured to accommodate multiple bands having both MIMO and SISO signals so that the extended service area is provided with coverage from a plurality of service providers and/or broadband services operating in different bands over one single transport media, such as an optical fiber 602. Such signals are provided by one or more BTS's. For the purposes of clarity, the description of FIGS. 14-15 is limited to the downlink signal paths. However, persons having ordinary skill in the art will understand that each downlink path has an associated uplink path which is provided in essentially the same manner using similar frequency conversions and sharing the same signal links.

Referring now to FIG. 14, the DAS 500 includes one or more master units 502 that interface with a plurality of service signals 490-494 such as from one or more base station transceivers (BTSs), an optical module 504 that couples the outputs of the master unit 502 to one or more remote units 506 over fiber-optic links, and a filter unit 508 that couples the outputs of the remote units 506 to a plurality of extension units, such as, for example three extension units 510, 512, 514. The master units 502 include uplink and downlink BTS connection modules 516, 518, frequency conversion modules 520, 522, and band combining modules 524, 526. Each of the uplink and downlink BTS connection modules 516, 518 includes a plurality of radio frequency (RF) signal attenuators 530-537 and 540-547, which couple uplink signals from the DAS 500 back to the signal sources or BTSs 490-494 and downlink signals from the signal sources or BTSs 490-494 to the DAS 500, respectively.

The plurality of BTSs 490-494 may include BTSs operating in different frequency bands and supporting different air interfaces. A low-band BTS 490 transmits and receives low-band MIMO (L-MIMO or L1 /L2 ) signals over the evolved NodeB (eNB) air interface and operates in the 800 MHz band. To support MIMO, the low-band BTS 490 has two outputs or channels, with the first output providing a L-MIMO-1 or L1 signal and the second output providing an L-MIMO-2 or L2 signal. As noted, although a 2×2 MIMO scheme is shown in the examples illustrated, the invention is not so limited to such a MIMO scheme.

A low-band legacy BTS 491 transmits and receives GSM signals in the 900 MHz band. The LL-BTS 491 of the exemplary embodiment does not support MIMO, and thus has a single output.

A mid-band BTS 492 transmits and receives mid-band MIMO (M-MIMO) signals over the eNB air interface and operates in the 1800 MHz band. As with the low-band BTS 490, the mid-band BTS 492 has two outputs or channels, with the first output providing an M-MIMO-1 or M1 signal and the second output providing an M-MIMO-2 or M2 signal.

A mid-band legacy BTS 493 transmits and receives mid-band Universal Mobile Telecommunications System (MM-UMTS) signals in the 2100 MHz band. As with the low-band legacy BTS 491, the mid-band legacy BTS 493 of the exemplary embodiment does not support MIMO, and thus has a single output.

An upper-band BTS 494 transmits and receives upper-band MIMO (U-MIMO) signals over the eNB air interface and operates in the 2600 MHz band. As with the low-band and mid-band BTSs 490, 492, the upper-band BTS 490 has two outputs or channels, with the first output providing a U1 or U1 signal and the second output providing a U-MIMO-2 or U2 signal.

The low band L1 and L2 signals from the low-band BTS 490 are coupled to the master unit 502 by duplexers 550, 552, which separate the L-MIMO signals into a uplink signals 554a, 554b and downlink signals 556a, 556b. The L1 and L2 downlink signals pass through signal attenuators 540 and 542, respectively, which couple a portion of the downlink signals to the downlink frequency conversion module 522. While embodiments of the invention herein provide frequency translation for all the MIMO signals, the embodiment in FIGS. 14 and 15 provide a translation of only one of the signals. The downlink frequency conversion module 522 provides the L1 downlink signal 556a to the band combining module 526 relatively unaltered or at its original frequency. However, to preserve the information contained in the L2 downlink signal 556b, the L2 downlink signal 556b is frequency shifted by a first appropriate shift frequency amount SF1, so that the shifted L2 downlink signal 556b* is frequency shifted from an original frequency to a different frequency such as into a thirteenth frequency band FB13. For consistency with respect to the other described embodiments, the different bands used for frequency shifting are numbered consecutively, but that does not mean that as between different embodiments the bands must be unique. Rather, an appropriate frequency band is chosen so as to provide the desired signal segregation in accordance with the invention. The L1 and shifted (as designated with an *) L2 downlink signals 556a, 556b* are provided to the downlink band combining module 526 where they are combined with other downlink signals as described in more detail below.

In a similar fashion as described with respect to the low-band BTS signals 554, 556, the LL-GSM signal from the low-band legacy BTS 491 is a non-MIMO signal, such as a SISO signal, and is coupled to the master unit 502 by duplexer 558, which separate the LL-GSM signal into a downlink signal 560 and an uplink signal 562. The LL-GSM downlink signal 560 passes through signal attenuator 541, which couples a portion of the downlink signal 560 to the downlink frequency conversion module 522. The downlink frequency conversion module 522 provides the LL-GSM downlink signal 560 to the band combining module 526 relatively unaltered or unshifted or at the original frequency, where it is combined with other downlink signals.

The M-MIMO-1 (M1 ) and M-MIMO-2 (M2 ) signals from the mid-band BTS 492 are coupled to the master unit 502 by duplexers 564, 566, which separate the M-MIMO signals into uplink signals 568a, 568b and downlink signals 570a, 570b. The M1 and M2 downlink signals 570a, 570b pass through signal attenuators 543 and 545, respectively, which couple portions of the downlink signals 570a, 570b to the downlink frequency conversion module 522. Similarly to the low-band MIMO signals, the downlink frequency conversion module 522 provides the M1 downlink signal 570a to the band combining module 526 relatively unaltered or unshifted or at an original frequency. However, to preserve the information contained in the M2 downlink signal 570b, the M2 downlink signal 570b is frequency shifted by a shift frequency amount SF2, so that the M2 downlink signal 570b* is shifted from an original frequency to a different frequency such as into a fourteenth frequency band FB14. The M1 and shifted M2 downlink signals 570a, 570b* are provided to the downlink band combining module 526 where they are combined with other downlink signals.

The MM-UMTS signal from the mid-band legacy BTS 493 is a non-MIMO signal, such as a SISO signal, and is coupled to the master unit 502 by duplexer 572, which separate the MM-UMTS signal into an uplink signal 574 and a downlink signal 576. The MM-UMTS downlink signal 576 passes through signal attenuator 544, which couples a portion of the downlink signal 576 to the downlink frequency conversion module 522. The downlink frequency conversion module 522 provides the MM-UMTS downlink signal 576 to the band combining module 526 relatively unaltered or unshifted or at the original frequency, where it is combined with other downlink signals.

The U-MIMO-1 (U1) and U-MIMO-2 (U2) signals from the upper-band BTS 494 are coupled to the master unit 502 by duplexers 578, 580, which separate the U-MIMO signals into uplink signals 582a, 582b and downlink signals 584a, 584b. The U1 and U2 downlink signals 584a, 584b pass through signal attenuators 546 and 547, respectively, which couple portions of the downlink signals 584a, 584b to the downlink frequency conversion module 522. Similarly to the low and mid-band MIMO signals, the downlink frequency conversion module 522 provides the U1 downlink signal 584a to the band combining module 526 relatively unaltered of unshifted or at an original frequency. However, to preserve the information contained in the U2 downlink signal 584b, the U2 downlink signal 584b is frequency shifted a shift frequency amount SF3, so that the shifted U2 downlink signal 584b* is shifted from an original frequency to a different frequency such as into a fifteenth frequency band FB15. The U1 and shifted U2 downlink signals 584a, 584b* are provided to the downlink band combining module 526 where they are combined with other downlink signals for transmission to the remote unit 506.

In order to keep the MIMO channel signals for each MIMO band or MIMO set the master unit from interfering with each other, the master unit is operable to convert the various MIMO channel signals to different frequencies wherein the different frequency of one set of MIMO channel signals is different from the different frequency of another set of MIMO channel signals. For example, as discussed above, each of the FB13, FB14, and FB15 frequencies or frequency bands are different so that they may be transceived over the same fiber optic cable without interfering with each other.

The downlink band combining module 526 includes a low-band duplexer 586, and a high band duplexer 588. The low band duplexer 586 is coupled to L1 signal 556a, LL-GSM signal 560, frequency converted M2 signal 570b*, and frequency converted U2 signal 584b*. The aforementioned signals are thereby combined into a composite low band downlink signal 590 that includes signals in the fourteenth and fifteenth frequency bands FB14, FB15 as well as frequencies in about the 800 MHz and 900 MHz ranges. Similarly, the high band duplexer 588 is coupled to the frequency converted L2 signal 556b*, the MM-UMTS signal 576, and the U1 signal 584a. The aforementioned signals are thereby combined into a composite high band downlink signal 592 that includes signals in the thirteenth frequency band FB13 as well as frequencies in about the 2100 and 2600 MHz ranges. The remaining M1 signal 570a is passed through the band combining module relatively unaltered. The bands used for frequency shifting may be chosen so as to be close to existing service bands that are already being handled. That is one or more of the MIMO channel signals are converted to a different frequency that is close to the original frequency of the unshifted or original frequency of the MIMO or non-MIMO signals. In that way, the signals may be efficiently combined and separated at the remote and master units using appropriate band combining and band separating circuit components such as combiners and duplexers. For example, the frequency converted M2 and U2 signals are converted so as to be close to the L-band (800 MHz) and LL-Band (900 MHz). Alternatively, the shifted L2 signal is shifted so as to be close to the MM-band (2100 MHz) and U-band (2600 MHz). As such efficient use of components is provided.

The M1 downlink signal 570a, composite low-band downlink signal 590, and composite high-band downlink signal 592 are coupled to the optical module 504. The optical module 504 includes an appropriate electrical-to-optical circuit 594, an optical-to-electrical circuit 596, and a wavelength-division multiplexer 598. The wavelength-division multiplexer 598 couples the composite optical downlink signal having a first wavelength, or color onto the optical fiber 602 and extracts the composite uplink signal having a second wavelength, or color from the same optical fiber 602. The M1 and composite downlink signals 570a, 590, 592 are coupled to the input of electrical-to-optic circuit 594, which converts the signals into a composite downlink optical signal 600. The composite downlink optical signal 600 is coupled to the optical fiber 602, for transporting the composite downlink optical signal 600 to the remote unit 506.

Referring now to FIG. 15, the remote unit 506 is configured to receive and transmit optical signals over the optic fiber 602, convert between optical signals and electrical signals, and receive and transmit RF electrical signals via one or more extension units 510, 512, 514 and via one or more antennas 618. The remote unit 506 thereby provides wireless coverage to the extended service area. To this end, the remote unit 506 includes an optical module 604, a low-band downlink duplexer 606, a high-band downlink duplexer 608, power amplifiers 610-612, a post-amplification duplexer 614, an antenna feed duplexer 616, an antenna 618, and one or more extension ports 628.

The optical module 604 includes a wavelength-division multiplexer 620 that is coupled to an optical-to-electrical downlink receiver circuit 622 and an electrical-to-optical uplink transmitter circuit 624. The composite downlink optical signal 600 is coupled from the optic fiber 602 to the optical-to-electrical circuit 622 by the wavelength-division multiplexer 620. In turn, the optical-to-electrical circuit 622 converts the composite downlink optical signal 600 into a composite downlink electrical signal, thereby recovering the M1 signal 570a, low-band composite downlink signal 590, and high-band composite downlink signal 592.

The low-band and high-band composite downlink signals 590, 592 are coupled to the low-band and high-band downlink duplexers, 606, 608 respectively. In turn, the low-band downlink duplexer 606 separates the low-band composite downlink signal 590 into L1 signal 556a, LL-GSM signal 560, and a U/M-MIMO-2 composite signal 626 comprising the frequency shifted M2 and U2 signals 570b*, 584b*. Similarly, the high-band downlink duplexer 608 separates the high-band composite signal 592 into the frequency shifted L2 signal 556b*, MM-UMTS signal 576, and U1 signal 584a.

The LL-GSM signal 560, M1 signal 570a, and MM-UMTS signal 576 are coupled to power amplifiers 610, 611, and 612 respectively, which amplify the signals to a level suitable for providing wireless coverage. In turn, the resulting amplified signals are coupled to antenna 618 by the post-amplification and antenna duplexers 614, 616. The remote unit 506 thereby provides wireless coverage to the extended service area by extending the coverage of the low-band and mid-band legacy BTSs 491, 493. The remote unit 506 also extends the service area for the M1 signal 570a.

In the specific embodiment illustrated in FIG. 15, the remaining L1 signal 556a, frequency shifted L2 signal 556b*, U1 signal 584a, and U/M-MIMO-2 composite signal 626 are coupled to an appropriate filter unit 508 through the extension port 628, which is coupled to an input port 630 of the filter unit 508 via suitable transmission lines. However, it should be understood that in alternative embodiments, a suitably configured extension unit may be coupled directly to the extension port 628, in which case the filter unit 508 would be omitted. In the embodiment illustrated in FIG. 15, the filter unit 508 includes, in addition to the input port 630, three output ports 632-634 and a duplexer 636 that separates the frequency shifted M2 and U2 signals 570b*, 584b*. The filter unit 508 is thereby configured so that:

(1) the L1 and frequency shifted L2 signals 556a, 556b* are coupled to the first filter unit output port 632, which in turn is coupled to the first extension unit 510;

(2) the frequency shifted M2 signal 570b* is coupled to the second filter unit output port 633, which in turn is coupled to the second extension unit 512; and (3) the U1 and frequency shifted U2 signals 584a, 584b* are coupled to the third filter unit output port 634, which in turn is coupled to the third extension unit 514.

The first extension unit 510 includes a frequency conversion circuit 638, transmit/receive duplexers 640, 642, power amplifiers 644, 646 and antennas 648, 650. The frequency shifted L2 signal 556b* is coupled to the input of the frequency conversion circuit 638, which shifts the signal by the first shift frequency amount SF1 so that the frequency range of the L2 signal 556b is restored to the same frequency range as the original L1 signal 556a for the air interface. The L1 and restored L2 signals 556a, 556b are coupled to the inputs of appropriate power amplifiers 644, 646, which in turn amplify the signals to a power level sufficient to cover the extended service area. The outputs of the power amplifiers 644, 646 are coupled to antennas 648, 650 by the transmit/receive duplexers 640, 642. The first extension unit 510 thereby extends the coverage of the low-band BTS 490 into the service area.

The second extension unit 512 includes a frequency conversion circuit 652, a transmit/receive duplexer 654, a power amplifier 656, and an antenna 658. The frequency shifted M2 signal 570b* is coupled to the input of the frequency conversion circuit 652, which shifts the signal by the second shift frequency amount SF2 so that the frequency range of the M2 signal 570b is restored to the same frequency range as the original M1 signal 570a. The restored M2 signal 570b is coupled to the input of power amplifier 656, which in turn amplifies the signal to a power level sufficient to cover the extended service area. The output of the power amplifier 656 is coupled antenna 658 by the transmit/receive duplexer 654. The second extension unit 512, working in cooperation with the remote unit 506 (which transmits the M1 signal 570a) thereby extends the coverage of the mid-band BTS 492 into the service area.

The third extension unit 514 includes a frequency conversion circuit 660, transmit/receive duplexers 662, 664, power amplifiers 666, 668 and antennas 670, 672. The frequency shifted U2 signal 584b* is coupled to the input of the frequency conversion circuit 660, which shifts the signal by the third shift frequency amount SF3 so that the frequency range of the U2 signal 584b is restored to the same frequency range (2620-2690 MHz) as the U1 signal 584a. The U1 and restored U2 signals 584a, 584b are coupled to the inputs of power amplifiers 666 and 668, which in turn amplify the signals to a power level sufficient to cover the extended service area. The outputs of the power amplifiers 666, 668 are coupled to antennas 670, 672 by the transmit/receive duplexers 662, 664. The third extension unit 512 thereby extends the coverage of the upper-band BTS 494 into the service area.

The frequency conversion circuits 638, 652, 660 in the extension units 510, 512, 514 may include local oscillators, mixers, and filters as is known in the art. To synchronize the local oscillators in the extension units 510, 512, 514 with the local oscillators in the frequency conversion modules 520, 522 in the master unit 502, the frequency conversion circuits 638, 652, 660 may receive a common reference signal transmitted via the same downlink path as the BTS signals. This common reference signal transmitted from the master unit to the remote unit and to the filter unit and all extension units may be used to synchronize the offset frequencies of the frequency conversion circuits 638, 652, 660 with their associated frequency conversion circuits in the frequency conversion module 522 and to frequency lock all of the frequency synthesizers used for frequency conversion. The common reference signal or signals may thereby allow the frequency converted signals to be recovered to their original frequency with minimal error. In an alternative embodiment, high stability reference sources may be used in the conversion modules 520, 522 and extension units 510, 512, 514 to provide frequency matching between the conversion stages.

The invention in its broader aspects is not limited to the specific details representative apparatus and method, and illustrative examples shown and described. Accordingly, departures may be made from such details without departure from the spirit or scope of the applicants' general inventive concept. For example, embodiments of the invention may shift or convert frequencies by either downconverting or upconverting the frequency. Thus, in a downlink direction, at least one MIMO signal received by a master unit may be upconverted before such signal is passed over an optical link to a remote unit and/or extension unit. This upconverted signal may then be downconverted to the appropriate MIMO band by the remote unit and/or extension unit before it is transmitted. Alternative embodiments of the invention may, instead, downconvert at least one signal received by the master unit before such signal is passed over an optical link to the remote unit and/or extension unit, then upconvert that signal to the MIMO band at the remote unit and/or extension unit. Therefore, the direction of the frequency conversion is not limiting, as described herein, for the exemplary embodiments. Correspondingly, in an uplink direction, at least one signal received by the remote unit and/or extension unit may be upconverted before such signal is passed over an optical ink to the master unit. This upconverted signal may then downconverted to the MIMO band by the master unit before it is transmitted back to a BTS. Alternative embodiments of the invention may, instead, downconvert at least one signal received by the remote unit and/or extension unit before such signal is passed over an optical link to the master unit, then upconvert that signal at the master unit to the appropriate MIMO band.

Moreover, the DAS systems of FIGS. 2A-2B, 3A-3B, 4A-4C, 6A-6B, and 7A-7B, and the components or circuits or FIGS. 5 and 8-15 may include more or fewer components consistent with embodiments of the invention. In particular, each master unit 46 of a MIMO DAS system may communicate with more than three sets of remote units and receive more signals than those shown or described. Such a master unit 46 can support up to 124 remote units in point to point architecture and or up to 31 optical links in cascaded architecture with up to 4 remote units per optical link in one embodiment of the invention. As such, the systems of FIGS. 2A-2B, 3A-3B, 4A-4C, 6A-6B, and 7A-7B may be configured with more or fewer master units, remote units, extension units, or other components consistent with embodiments of the invention.

Other modifications will be apparent to one of ordinary skill in the art. Therefore, the invention lies in the claims hereinafter appended.

What is claimed is:

1. A distributed antenna system, comprising:
    a master unit configured to receive at least one set of multiple input multiple output (MIMO) channel signals at an original MIMO frequency from at least one signal source, the MIMO channel signals including at least a first MIMO channel signal and a second MIMO channel signal;
    the master unit further configured to receive at least one non-MIMO signal that has a frequency in a first legacy service frequency band and having a band processing circuit component configured for processing the signal in the first legacy service frequency band;
    the master unit being configured to frequency convert at least one of the first and second MIMO channel signals from the original MIMO frequency to a different frequency close to the first legacy service frequency band, the master unit further configured to process the at least one converted MIMO channel signal and the non-MIMO signal using the same band processing circuit component, and to combine non-MIMO signals in the first legacy service band and the first MIMO channel signal and the second MIMO channel signal for transmission;
    an optical link operably coupled with the master unit;
    a unit located remotely from the master unit and in communication with the master unit via the optical link for transceiving the MIMO channel signals and non-MIMO signals, the unit including band processing circuitry configured for processing together the non-MIMO signal in the first legacy service frequency band and the at least one converted MIMO channel signal and separating the converted MIMO channel signal from the non-MIMO signal;
    conversion circuitry configured to receive the at least one converted MIMO channel signal and to frequency convert the at least one converted MIMO channel signal from the frequency close to the first legacy service frequency band back to the original MIMO frequency for transmission over one or more antennas.

2. The distributed antenna system of claim 1 wherein the master unit is configured to frequency convert both of the first and second MIMO channel signals to a different frequency, the master unit further configured to frequency convert the first MIMO channel signal to a frequency that is different from the frequency of the second MIMO channel signal.

3. The distributed antenna system of claim 2 wherein the conversion circuitry is configured to frequency convert all of the MIMO channel signals back to the original MIMO frequency for transmission over one or more antennas.

4. The distributed antenna system of claim 1 wherein the master unit generates an LO signal and is configured for transmitting the LO signal to unit located remotely from the master unit over the optical link, the LO signal being used by the master unit for frequency converting at least one of the first and second MIMO channel signals to a different frequency close to the first legacy service frequency band from the MIMO original frequency.

5. The distributed antenna system of claim 4 wherein the conversion circuitry is configured to receive the LO signal from the remote unit and use the LO signal for frequency converting at least one of the first and second MIMO channel signals from the different frequency close to the first legacy service frequency band back to the original MIMO frequency.

6. The distributed antenna system of claim 4, the master unit including circuitry for using the LO signal for generating other frequency signals for use in converting at least one of the first and second MIMO channel signals to a different frequency close to the first legacy service frequency band from the original MIMO frequency.

7. The distributed antenna system of claim 1 wherein the optical link includes at least one of the following: at least one fiber-optic cable for transceiving both uplink signals and downlink signals between the unit and master unit or at least two fiber optic cables with one fiber-optic cable for transceiving uplink signals between the unit and master unit and another fiber-optic cable for transceiving downlink signals between the unit and master unit.

8. The distributed antenna system of claim 1 further comprising at least one remote unit in communication with the master unit via the optical link, the conversion circuitry located in the at least one remote unit.

9. The distributed antenna system of claim 1 further comprising at least one extension unit in communication with the at least one remote unit, the conversion circuitry located in the at least one extension unit.

10. The distributed antenna system of claim 1 wherein the legacy service frequency band is lower in frequency than the original MIMO frequency of the MIMO channel signals, the master unit configured to frequency convert at least one of the first and second MIMO channel signals from the original MIMO frequency to a lower different frequency that is close to the legacy service frequency band.

11. The distributed antenna system of claim 1 wherein the legacy service frequency band is higher in frequency than the original MIMO frequency of the MIMO channel signals, the master unit configured to frequency convert at least one of the first and second MIMO channel signals from the original MIMO frequency to a higher different frequency that is close to the legacy service frequency band.

12. The distributed antenna system of claim 1 wherein the master unit is further configured for receiving at least one additional set of MIMO channel signals at another original MIMO frequency different from the original MIMO frequency of the at least one set of MIMO signals, the master unit being configured to frequency convert at least one of first and second MIMO channel signals of the additional set of MIMO channel signals to another different frequency close to the first legacy service frequency band from the another original MIMO frequency, the master unit configured for combining the sets of MIMO channel signals for transmission.

13. The distributed antenna system of claim 12 further comprising a plurality of extension units coupled to the at least one remote unit, conversion circuitry located in each of the plurality of extension units for frequency converting at least one of the first and second converted MIMO channel signals of the set from the frequency close to the legacy service frequency bands back to the original MIMO frequency for transmission over one or more antennas.

14. The distributed antenna system of claim 12 wherein the master unit is further configured to frequency convert at least one of the first and second MIMO channel signals of the additional set of MIMO channel signals to another different frequency that is close to the original MIMO frequency of the at least one set of MIMO channels signals, the master unit configured for combining the sets of MIMO channel signals for transmission.

15. The distributed antenna system of claim 1 wherein at least one of the first and second MIMO channel signals is maintained at an original MIMO frequency, the unit located remotely from the master unit being configured for transmitting at least one of the first and second MIMO channel signals at the original MIMO frequency over one or more antennas.

16. A distributed antenna system, comprising:
a master unit configured to receive a plurality of sets of multiple input multiple output (MIMO) channel signals, at respective original first and second MIMO frequencies, each set of MIMO channel signals including at least a first MIMO channel signal and a second MIMO channel signal;
the master unit further configured to receive a plurality of non-MIMO signals that have original frequencies in at least a first legacy service frequency band and a second legacy service frequency band and having a band processing circuit component configured for processing a signal in the first legacy service frequency band and a band processing circuit component configured for processing a signal in the second legacy service frequency band;
the master unit being configured to frequency convert at least one of the first MIMO frequency channel signals from the first MIMO frequency to a different frequency close to the first legacy service frequency band and configured to frequency convert at least one of the second MIMO frequency channel signals from the second MIMO frequency to a different frequency close to the second legacy service frequency band;
the master unit further configured to process the at least one converted first MIMO frequency channel signal and the first legacy service band non-MIMO signal using the same band processing circuit component and configured to process the at least one converted second MIMO frequency channel signal and the second legacy service band non-MIMO signal using the same band processing circuit component, and to combine signals in the first and second legacy service bands and the first MIMO frequency channel signals and the second MIMO frequency channel signals of the set for transmission;
an optical link operably coupled with the master unit;
at least one unit located remotely from the master unit and in communication with the master unit via the optical link for transceiving the sets of MIMO frequency signals and signals in the first and second legacy service bands between the remote unit and the master unit, the remote unit including a first band processing circuit component configured for processing together the first legacy service frequency band non-MIMO signal and the at least one converted first MIMO frequency channel signal and further including a second band processing circuit component configured for processing together the second legacy service frequency band non-MIMO signal and the at least one converted second MIMO frequency channel signal;
the first band processing circuit component configured for separating the converted first MIMO frequency channel signals from the respective legacy service band non-MIMO signals and the second band processing circuit component configured for separating the converted second MIMO frequency channel signal the respective legacy service band non-MIMO signals;
a plurality of conversion circuits, at least one conversion circuit configured to receive the at least one converted first MIMO frequency channel signal and to frequency convert the at least one converted first MIMO frequency channel signal from the frequency close to the first legacy service frequency band and back to the respective first MIMO frequency and at least one conversion circuit configured to receive the at least one converted second MIMO frequency channel signal and to frequency convert the at least one converted second MIMO frequency channel signal from the frequency close to the second legacy service frequency band and back to the respective second MIMO frequency for transmission over one or more antennas.

17. The distributed antenna system of claim 16 wherein at least one of the first and second MIMO channel signals of a set of signals is maintained at an original MIMO frequency, the unit located remotely from the master unit being configured for transmitting at least one of the first and second MIMO channel signals at the original frequency over one or more antennas.

18. The distributed antenna system of claim 17 wherein at least one of the first and second MIMO channel signals of a set of signals is maintained at an original MIMO frequency, the system configured for transmitting both the MIMO channel signal of the set at the original MIMO frequency and another MIMO channel signal of the set that is converted from the frequency close to a legacy service frequency band back to the respective original MIMO frequency.

19. The distributed antenna system of claim 1 wherein the master unit is configured to frequency convert both of the first and second MIMO channel signals of at least one of the first and second MIMO frequencies to a different frequency, the master unit further configured to frequency convert the first MIMO channel signal of a set to a frequency that is different from the frequency of the second MIMO channel signal of the set.

20. The distributed antenna system of claim 16 wherein the optical link includes at least one of the following: at least one fiber-optic cable for transceiving both uplink signals and downlink signals between the unit and master unit or at least two fiber optic cables with one fiber-optic cable for transceiving uplink signals between the unit and master unit and another fiber-optic cable for transceiving downlink signals between the unit and master unit.

* * * * *